US010148992B2

(12) United States Patent
Sarosi et al.

(10) Patent No.: US 10,148,992 B2
(45) Date of Patent: Dec. 4, 2018

(54) APPARATUS AND METHODS FOR RECORDING, ACCESSING, AND DELIVERING PACKETIZED CONTENT

(71) Applicant: Time Warner Cable Enterprises LLC, New York, NY (US)

(72) Inventors: George Sarosi, Niwot, CO (US); Wilfred Jaime Miles, Arvada, CO (US); Chris Cholas, Frederick, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 15/483,948

(22) Filed: Apr. 10, 2017

(65) Prior Publication Data

US 2017/0230702 A1    Aug. 10, 2017

Related U.S. Application Data

(62) Division of application No. 14/290,502, filed on May 29, 2014, now Pat. No. 9,621,940.

(51) Int. Cl.
*H04N 21/2747* (2011.01)
*H04N 21/274* (2011.01)
(Continued)

(52) U.S. Cl.
CPC ..... *H04N 21/2747* (2013.01); *H04N 21/2187* (2013.01); *H04N 21/2353* (2013.01);
(Continued)

(58) Field of Classification Search
None
See application file for complete search history.

(56) References Cited

U.S. PATENT DOCUMENTS 5,369,707 A   11/1994   Follendore, III
5,577,209 A   11/1996   Boyle et al.
(Continued)

FOREIGN PATENT DOCUMENTS

WO   WO-0177778 A2   10/2001
WO   WO-0213032 A1    2/2002
(Continued)

OTHER PUBLICATIONS

5C Digital Transmission Content Protection White Paper, Hitachi, Ltd., et al., dated Jul. 14, 1998, 15 pages.
(Continued)

*Primary Examiner* — Ricky Chin
(74) *Attorney, Agent, or Firm* — Gazdinski & Associates, PC

(57) ABSTRACT

Apparatus and methods to manage recording of streaming packetized content (such as for example live IP packetized content) for access, retrieval and delivering thereof to one or more users. In one embodiment, the foregoing is accomplished via communication between a recording manager and a receiver/decoder device. The recording manager manages and schedules recording of content on behalf of the receiver/decoder device (and/or mobile devices) disposed at a user's premises. The recording manager runs one or more computer programs designed to receive requests to record packetized content from one or more consumer devices, and use metadata contained within the requests to cause a cloud storage entity or premises storage device to record the content at its scheduled date/time (either via the receiver/decoder device itself, or another network entity). In this manner, the recording manager provides digital video recording (DVR) functionality to devices that would be otherwise incapable of scheduling a recording and/or recording such content.

17 Claims, 13 Drawing Sheets

(51) Int. Cl.

| | | |
|---|---|---|
| H04N 21/258 | (2011.01) | |
| H04N 21/41 | (2011.01) | |
| H04N 21/436 | (2011.01) | |
| H04N 21/433 | (2011.01) | |
| H04N 21/4147 | (2011.01) | |
| H04N 21/2187 | (2011.01) | |
| H04N 21/235 | (2011.01) | |
| H04N 21/25 | (2011.01) | |
| H04N 21/2387 | (2011.01) | |
| H04N 21/45 | (2011.01) | |
| H04N 21/254 | (2011.01) | |

(52) U.S. Cl.
CPC ....... *H04N 21/2387* (2013.01); *H04N 21/251* (2013.01); *H04N 21/254* (2013.01); *H04N 21/258* (2013.01); *H04N 21/25875* (2013.01); *H04N 21/274* (2013.01); *H04N 21/41* (2013.01); *H04N 21/4147* (2013.01); *H04N 21/433* (2013.01); *H04N 21/436* (2013.01); *H04N 21/4334* (2013.01); *H04N 21/45* (2013.01)

(56) References Cited

U.S. PATENT DOCUMENTS

| | | |
|---|---|---|
| 5,787,172 A | 7/1998 | Arnold |
| 5,828,832 A | 10/1998 | Holden et al. |
| 5,870,474 A | 2/1999 | Wasilewski et al. |
| 6,148,400 A | 11/2000 | Arnold |
| 6,154,844 A | 11/2000 | Touboul et al. |
| 6,157,719 A | 12/2000 | Wasilewski et al. |
| 6,167,521 A | 12/2000 | Smith et al. |
| 6,212,636 B1 | 4/2001 | Boyle et al. |
| 6,233,341 B1 | 5/2001 | Riggins |
| 6,256,393 B1 | 7/2001 | Safadi et al. |
| 6,456,716 B1 | 9/2002 | Arnold |
| 6,760,768 B2 | 7/2004 | Holden et al. |
| 6,785,810 B1 | 8/2004 | Lirov et al. |
| 6,898,708 B2 | 5/2005 | Hori et al. |
| 6,948,183 B1 | 9/2005 | Peterka |
| 7,017,189 B1 | 3/2006 | Demello et al. |
| 7,054,443 B1 | 5/2006 | Jakubowski et al. |
| 7,073,199 B1 | 7/2006 | Raley |
| 7,257,227 B2 | 8/2007 | Chen et al. |
| 7,266,726 B1 | 9/2007 | Ladd et al. |
| 7,299,502 B2 | 11/2007 | Schmeling et al. |
| 7,783,891 B2 | 8/2010 | Perlin et al. |
| 8,341,242 B2 | 12/2012 | Dillon et al. |
| 8,520,850 B2 | 8/2013 | Helms et al. |
| 9,826,273 B2 * | 11/2017 | Barton ................ H04N 5/765 |
| 2001/0019614 A1 | 9/2001 | Madoukh et al. |
| 2001/0029581 A1 | 10/2001 | Knauft |
| 2001/0053226 A1 | 12/2001 | Akins et al. |
| 2002/0026575 A1 | 2/2002 | Wheeler et al. |
| 2002/0183985 A1 | 12/2002 | Hori et al. |
| 2003/0056217 A1 | 3/2003 | Brooks |
| 2003/0084003 A1 | 5/2003 | Pinkas et al. |
| 2003/0140227 A1 | 7/2003 | Asano et al. |
| 2003/0163697 A1 | 8/2003 | Pabla et al. |
| 2003/0187799 A1 | 10/2003 | Sellars et al. |
| 2003/0208763 A1 | 11/2003 | McElhatten et al. |
| 2003/0217365 A1 | 11/2003 | Caputo |
| 2004/0078602 A1 | 4/2004 | Rothbarth et al. |
| 2004/0123129 A1 | 6/2004 | Ginter et al. |
| 2004/0128499 A1 | 7/2004 | Peterka et al. |
| 2004/0181800 A1 | 9/2004 | Rakib et al. |
| 2004/0224425 A1 | 11/2004 | Gjerde et al. |
| 2004/0261093 A1 | 12/2004 | Rebaud et al. |
| 2005/0005287 A1 | 1/2005 | Claussen |
| 2005/0039212 A1 | 2/2005 | Baran et al. |
| 2005/0114900 A1 | 5/2005 | Ladd et al. |
| 2005/0169468 A1 | 8/2005 | Fahrny et al. |
| 2005/0177741 A1 | 8/2005 | Chen et al. |
| 2005/0190912 A1 | 9/2005 | Hopkins et al. |
| 2005/0195975 A1 | 9/2005 | Kawakita |
| 2005/0278259 A1 | 12/2005 | Gunaseelan et al. |
| 2006/0020786 A1 | 1/2006 | Helms et al. |
| 2006/0020950 A1 | 1/2006 | Ladd et al. |
| 2006/0036750 A1 | 2/2006 | Ladd et al. |
| 2006/0041903 A1 | 2/2006 | Kahn et al. |
| 2006/0047957 A1 | 3/2006 | Helms et al. |
| 2006/0064583 A1 | 3/2006 | Birnbaum et al. |
| 2006/0130107 A1 | 6/2006 | Gonder et al. |
| 2006/0130113 A1 | 6/2006 | Carlucci et al. |
| 2006/0137015 A1 | 6/2006 | Fahrny et al. |
| 2006/0179138 A1 | 8/2006 | Van et al. |
| 2007/0022459 A1 | 1/2007 | Gaebel et al. |
| 2007/0094691 A1 | 4/2007 | Gazdzinski |
| 2007/0104456 A1 * | 5/2007 | Craver ............... H04N 5/44543 386/291 |
| 2007/0204314 A1 | 8/2007 | Hasek et al. |
| 2007/0206799 A1 | 9/2007 | Wingert et al. |
| 2007/0217436 A1 | 9/2007 | Markley et al. |
| 2008/0139193 A1 * | 6/2008 | Hao .................... H04N 7/17318 455/420 |
| 2008/0306962 A1 * | 12/2008 | Grannan ................ H04N 5/782 |
| 2009/0228929 A1 * | 9/2009 | Cass ..................... H04N 5/782 725/58 |
| 2010/0031296 A1 * | 2/2010 | Elias ................. H04N 7/17318 725/54 |
| 2010/0031299 A1 * | 2/2010 | Harrang ............. H04N 21/4104 725/80 |
| 2010/0146567 A1 * | 6/2010 | Mehta ................ H04N 7/17318 725/91 |
| 2010/0211636 A1 * | 8/2010 | Starkenburg ....... H04N 7/17318 709/203 |
| 2010/0251304 A1 | 9/2010 | Donoghue et al. |
| 2010/0251305 A1 | 9/2010 | Kimble et al. |
| 2011/0103374 A1 | 5/2011 | Lajoie et al. |
| 2012/0008786 A1 | 1/2012 | Cronk et al. |
| 2012/0011567 A1 | 1/2012 | Cronk et al. |
| 2012/0030714 A1 | 2/2012 | Sweatt, III et al. |
| 2012/0089699 A1 | 4/2012 | Cholas |
| 2012/0131629 A1 * | 5/2012 | Shrum, Jr. ....... H04N 21/26233 725/115 |
| 2012/0151525 A1 * | 6/2012 | Demchenko ......... H04N 21/482 725/39 |
| 2013/0191443 A1 * | 7/2013 | Gan .................... H04L 67/1097 709/203 |
| 2013/0309971 A1 * | 11/2013 | Kiukkonen ........... H04L 63/107 455/41.2 |
| 2013/0318629 A1 | 11/2013 | Lajoie et al. |
| 2014/0215509 A1 * | 7/2014 | Angiolillo .......... H04N 21/4113 725/25 |
| 2014/0233923 A1 * | 8/2014 | Bradley ........... H04N 21/25891 386/298 |
| 2014/0282750 A1 | 9/2014 | Civiletto |
| 2016/0269688 A1 * | 9/2016 | Gardner ........... H04N 21/23116 |
| 2017/0111694 A1 * | 4/2017 | Marsh ................ H04L 12/6418 |

FOREIGN PATENT DOCUMENTS

| | | |
|---|---|---|
| WO | WO-0221841 A1 | 3/2002 |
| WO | WO-03093944 A2 | 11/2003 |
| WO | WO-2004027622 A2 | 4/2004 |

OTHER PUBLICATIONS

DCAS Authorized Service Domain, Version 1.2, dated Nov. 4, 2008, 58 pages.

DCAS Licensed Specification Abstracts, CableLabs Confidential Information, Jan. 12, 2006, 4 pages.

Digital Video Broadcasting (DVB); DVB SimulCrypt; Part 1: "Head-end architecture and synchronization" Technical Specification—ETSI TS 101 197 V1.2.1 (Feb. 2002), 40 pages.

DVB (Digital Video Broadcasting), DVB Document A045 Rev. 3, Jul. 2004, "Head-end Implementation of SimulCrypt," 289 pages.

Federal Information Processing Standards Publication, US FIPS PUB 197, Nov. 26, 2001, "Advanced Encryption Standards (AES)," 47 pages.

(56) References Cited

OTHER PUBLICATIONS

High-bandwidth Digital Content Protection System, Revision 1.091, dated Apr. 22, 2003, Digital Content Protection LLC Draft, 78 pages.
Real System Media Commerce Suite Technical White Paper, Copyright 2011, Real Networks, Inc., 16 pages, (http://www.realnetworkis).
Van Moffaert, K., et al. ("Digital Rights Management: DRM is a key enabler for the future growth of the broadband access market and the telecom/networking market in general", Alcatel Telecommunications Review, Alcatel, Paris Cedex FR, Apr. 1, 2003, XP007005930ISSN; 8 pages.
Zhang, et al., A Flexible Content Protection System for Media-on-Demand, ISM China Research Lab, Proceedings of the IEEE Fourth International Symposium on Multimedia Software Engineering (MSE'02), 6 pages.

* cited by examiner

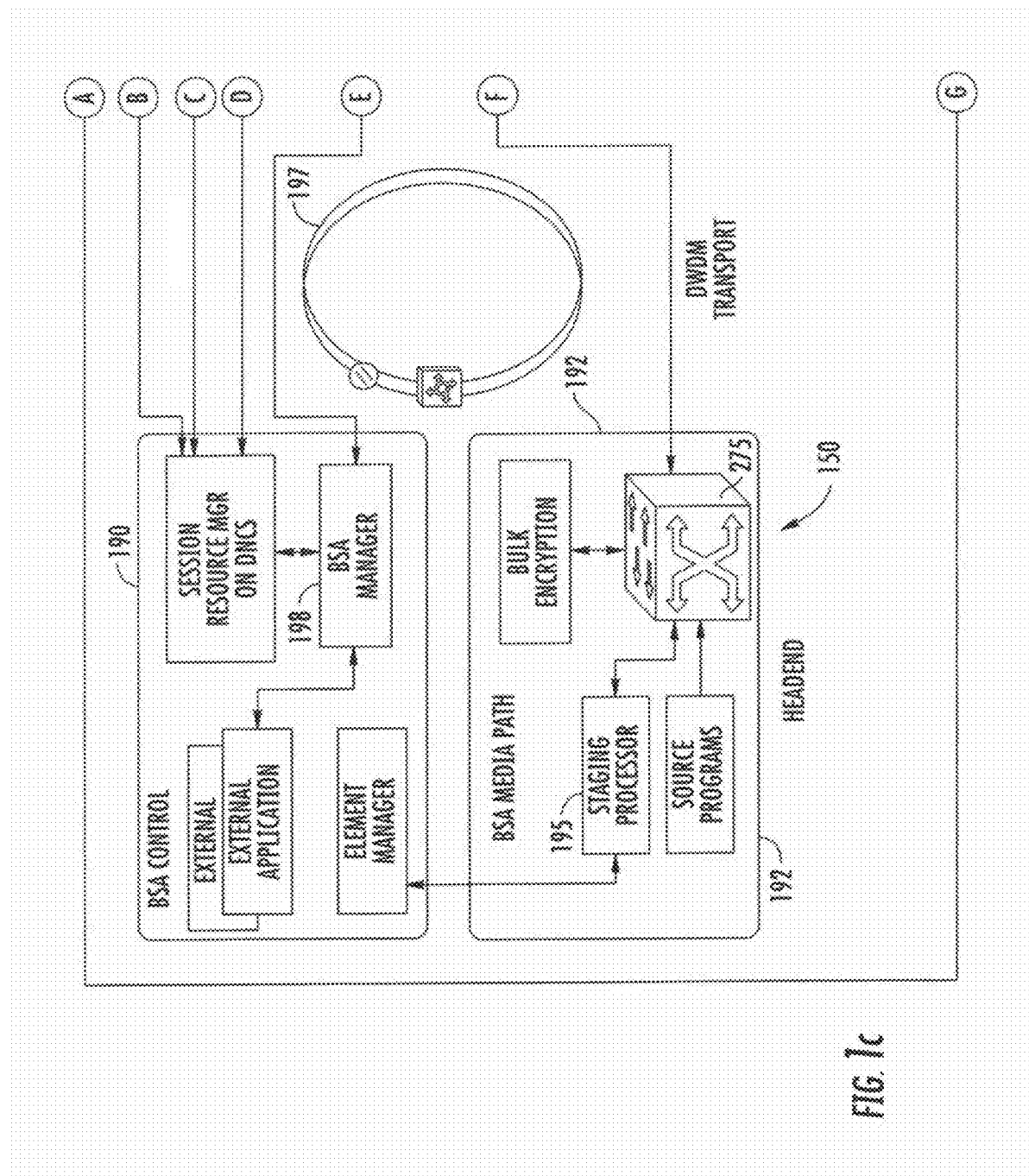

APPARATUS AND METHODS FOR RECORDING, ACCESSING, AND DELIVERING PACKETIZED CONTENT

PRIORITY

This application is a divisional of and claims priority to co-owned U.S. patent application Ser. No. 14/290,502 filed on May 29, 2014 of the same title, that issued as U.S. Pat. No. 9,621,940 on Apr. 11, 2017, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The disclosure relates generally to the field of content and/or data recording, access, and/or delivery, such as via a content distribution (e.g., cable, satellite) or other network (including e.g., the Internet). In one exemplary aspect, the disclosure relates to providing a network entity to manage recording of live packetized content (such as IP packetized content) for retrieval and delivery.

2. Description of Related Technology

Recent advances in video capture and data storage technologies have led to the proliferation of consumer electronics devices that allow a user to record video programming or other content received from a bearer network (such as e.g., a cable television or satellite network) on a digital video recorder (DVR) or personal video recorder (PVR), and contemporaneously or subsequently access the content. The advent of PVR technology has greatly increased the ability of a subscriber to utilize certain content delivered over their cable system on their schedule. Some PVR devices can be used to transmit the stored content over a network interface to another device (which may or may not be remote from the PVR) where the same or another user can access the content. As a result, PVRs allow users a great degree of control over the playback and viewing of their selected content.

Additionally, content recording and storage systems allow users of a network to obtain what would otherwise be "live" content (e.g., linear television broadcasts or the like) at a time convenient to the user. These systems typically receive instructions from the user as to which programming they want to view, and the requested content is streamed from storage to that user. Variants of these types of systems either receive prior instructions from a user before the broadcast of the live event, or alternatively store various content based on some other criteria (e.g., popularity), and then allow the user a period of time to watch it.

Content delivery has in recent years evolved to include delivery of packetized content, such as Internet Protocol (IP) packetized content. For example, consumers may receive content and data via any number of devices such as Roku®, Chromecast®, WD Play, Slingbox®, Netgear Push2TV®, TiVo Stream, Vizio Co-Star, Amazon FireTV, etc. Moreover, packetized content delivery is also enabled on most gaming consoles, smart TVs, smart Blu-ray players, etc. and may be streamed via Home Theater Personal Computers (HTPCs).

However, there exists no viable mechanism for recording packetized streaming content (including particularly contemporaneous or "live" streamed content) at a user premises or network for subsequent use by the user.

Moreover, in the context of a managed network, a content source or copyright owner seeks assurances that the network operator (e.g., multiple systems operator or MSO) which is entrusted with their valuable content will process and distribute this content within the limitations of the law, and not expose the content to undue risk of unauthorized reproduction or distribution. Content owners may be concerned with the reproduction of copies of their content within the network for distribution purposes. For example, a network operator may have restrictions on replicating and/or distributing content received from the content source. Certain activities are generally recognized as not being in violation of a content owner's copyright.

Accordingly, there is a need for improved methods and apparatus which enable recording of packetized content at a customer premises or at a network entity for later use by the customer. Ideally, such methods and apparatus would further maintain the integrity of the copyrights (and other rights or use restrictions) associated with the content and the content owner.

These methods and apparatus would also desirably be provided using substantially extant network infrastructure and components, and would be compatible with a number of different client device and delivery systems.

SUMMARY

The foregoing needs are satisfied herein by providing improved apparatus and methods for accessing, retrieving, and delivering recordings of live packetized content (such as IP packetized content).

In a first aspect, a method providing streaming content to a user of a content distribution network is disclosed. In one embodiment, the method comprises: (i) receiving a request for a content element originated from the user; (ii) based at least in part on the received request, causing storage of the content element at a storage location accessible to at least the user; and (iii) subsequent to the storage, making the stored content available to the user for delivery over the content distribution network.

In a second aspect, an apparatus configured to provide streaming content to a user of a content distribution network is disclosed. In one embodiment, the apparatus comprises: a processor; a storage element in data communication with the processor, the storage element comprising at least one computer program, the at least one program configured to, when executed: (i) receive requests for content elements originated from one or more users associated with the premises; (ii) send messages to a network entity responsible for causing recording of streaming media, each of the messages comprising at least information identifying at least one content element; and (iii) receive information comprising at least a storage location where the recorded streamed media is located so as to allow at least one of the users to access the recorded media for delivery over the network to a user rendering device.

In a third aspect, a computer readable apparatus comprising at least one computer program is disclosed in one embodiment, the computer program comprises a plurality of instructions which are configured to, when executed, (i) receive requests for content elements originated from one or more users associated with a premises; (ii) send messages to a network entity responsible for causing recording of streaming media, each of the messages comprising at least information identifying at least one content element; and (iii) receive information comprising at least a storage location where the recorded streamed media is located so as to allow at least one of the users to access the recorded media for delivery over the network to a user rendering device.

In a fourth aspect, a system for providing streaming content to a user of a content distribution network is disclosed. In one embodiment, the system comprises: (i) an apparatus configured to receive a request for a content element originated from the user; (ii) an apparatus configured to, based at least in part on the received request, cause storage of the content element at a storage location accessible to at least the user; and (iii) an apparatus configured to, subsequent to the storage, make the stored content available to the user for delivery over the content distribution network.

Figure 1:
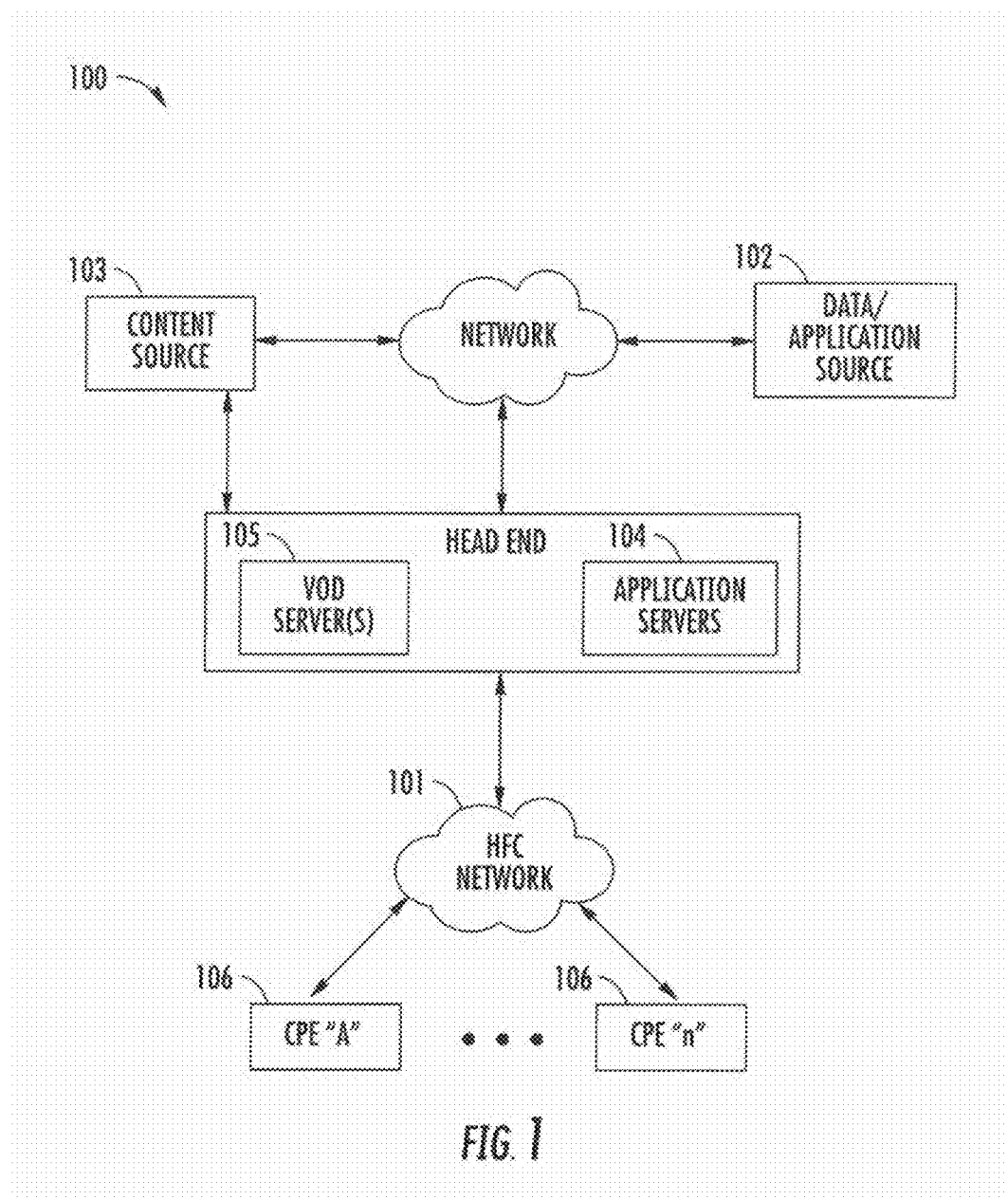
FIG. 1 is a functional block diagram illustrating an exemplary hybrid fiber coax (HFC) cable network configuration useful with various aspects of the present disclosure.

All Figures© Copyright 2014 Time Warner Cable Enterprises LLC. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein the term "browser" refers to any computer program, application or module which provides network access capability including, without limitation, Internet browsers adapted for accessing one or more websites or URLs over the Internet, as well as any "user agent" including those adapted for visual, aural, or tactile communications.

As used herein, the terms "client device", "user device", and "subscriber device" include, but are not limited to, set-top boxes (e.g., DSTBs), digital television sets, personal computers (PCs), and minicomputers, whether desktop, laptop, or otherwise, and mobile devices such as handheld computers, PDAs, personal media devices (PMDs), tablets, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AVC/H.264, AC-3 (audio), DiVX, XViD/ViDX, Windows Media Video (e.g., WMV 7, 8, or 9), ATI Video codec, or VC-1 (SMPTE standard 421M) families.

As used herein, the term "computer program", "application", or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment or function whereby content sent over a network can be recorded and selectively recalled, including without limitation so-called "personal video recording" (PVR) functions or devices. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include any information source/receiver including, inter alia, free-to-air TV channels, pay TV channels, interactive TV, and the Internet. DSTBs may take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the terms "Internet" and "internet" are used interchangeably to refer to inter-networks including, without limitation, the Internet.

As used herein, the terms "local" and "remote" refer generally and without limitation to devices, entities, or users that are serviced by substantially different communications modalities or channels. These terms are intended to be relative, and may bear no physical or absolute reference or connotation as to the placement of the communication channels or the served device, entities or users. For example, a "local" network may comprise the MSO cable or satellite network, whereas a "remote" network may comprise the Internet or a LAN/WAN/MAN, the latter which may serve the very same premises.

As used herein, the term "mass storage" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "modem" refers to any kind of modulation or demodulation process or apparatus including without limitation cable (e.g., DOCSIS compliant) modems, DSL modems, analog modems, and so forth.

As used herein, the terms "MSO" or "multiple system(s) operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, TCP/IP, H.323, etc.).

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), modem, Wi-Fi (802.11a, b,g,n,s,v), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to said schemes.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity. A user interface may comprise, for example, a computer screen display, touch screen, speech recognition engine, text-to-speech (TTS) algorithm, and so forth.

As used herein, the term "Wi-Fi" refers to, without limitation, any of the variants of IEEE-Std. 802.11 or related standards including e.g., 802.11 a/b/g/n/v.

As used herein, the term "wireless" means any wireless signal, data, communication, or other interface including without limitation Wi-Fi, Bluetooth, 3G, LTE/LTE-A, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, improved apparatus and methods are provided to, inter alia, enable management and storage of data and/or content.

In one embodiment, the foregoing is accomplished via communication between a recording manager and a receiver/decoder device.

A receiver/decoder device may comprise any number consumer premises devices which are configured to receive and decode IP content and render the same for display to a user (or are in communication with a device configured to render content). Some exemplary receiver/decoder devices may include Roku®, Chromecast®, WD Play, Slingbox®, Netgear Push2TV®, TiVo Stream, Vizio Co-Star, Amazon FireTV, gaming consoles, smart TVs, smart Blu-ray players, etc., as well as Home Theater Personal Computers (HTPCs).

The recording manager manages and schedules recording of content on behalf of the receiver/decoder device, and/or one or more mobile devices (which may themselves comprise receiver/decoder devices). In one specific implementation, the recording manager runs one or more computer programs designed to receive requests to record packetized content from one or more consumer devices, and uses metadata contained within the requests to cause a cloud storage entity or premises storage device to record the content at its scheduled date/time (either via the receiver/decoder device itself, or another network entity). In this manner, the recording manager provides digital video recording (DVR) functionality to devices that would be otherwise incapable of causing a storage entity to schedule a recording and/or record such content.

To accomplish the foregoing in the exemplary implementation, a metadata access entity at the recording manager utilizes information contained within the request to uniquely identify the content and the requesting subscriber (and/or subscriber device). This information may be further used for authentication/authorization purposes, as well as to locate specific or dedicated portions of a common storage entity. Authentication/authorization using metadata contained in the request may include e.g., (i) authenticating the user as a subscriber to the MSO, (ii) determining whether the requesting device is within or associated to a home network or other premises serviced by the MSO, and/or (iii) determining whether the subscriber's service level (subscription level) permits or entitles viewing of the requested content.

Additionally, the metadata may be used to determine, inter alia, a date, time, and program identifier of selected program. In one variant, a scheduler application at the recording manager runs the necessary timers to "wake up" at a pre-determined date/time and cause broadcast content, or content which is otherwise subject to scheduled delivery, to be transmitted to the storage entity for storage thereat. The scheduler for instance can be configured to "wake" the receiver/decoder device to cause it to send the particular content to storage. Alternatively, other headend or network entities may be used for this purpose.

Advantageously, consumer devices useful within the context of the present disclosure include e.g., any device capable of accessing and receiving packetized content from an internet or the like (e.g., the Internet), or a managed network. Moreover, in one variant, a non-IP capable device may be used to request that content be recorded, and the content accessed after it has been recorded by e.g., an IP-capable device also owned by the same user/subscriber.

In one implementation, the premises receiver/decoder device generates and displays a user interface, generates requests for access to content and scheduling requests, accesses and utilizes metadata, and streams media content within the home or premises. In another variant, the receiver/decoder device may act as a proxy for other premises or mobile devices; e.g., the mobile device can access the managed network via communication to the receiver/decoder device. Alternatively, the mobile device may comprise a mobile portion of a distributed application or client/server relationship which is configured to access and utilize functionality of the receiver/decoder device, or may access the managed network directly (e.g., via the Internet).

DETAILED DESCRIPTION OF EXEMPLARY EMBODIMENTS

Exemplary embodiments of the apparatus and methods are now described in detail. While these exemplary embodiments are described in the context of the aforementioned managed network (e.g., hybrid fiber coax (HFC) cable architecture) used in conjunction with e.g., a "secondary" communication channel or network, the general principles and advantages of the system may be extended to other types of networks and architectures where delivery of content is required or desirable, whether broadband, narrowband, wired or wireless, content or data, or otherwise, and irrespective of topology. Hence, the following description is merely exemplary in nature.

It will also be appreciated that while described generally in the context of a network providing service to a consumer (i.e., home) end user domain, the system may be readily adapted to other types of environments including, e.g., commercial/enterprise, and government/military applications. Myriad other applications are possible.

Furthermore, as referenced above, the system is in no way limited to traditional cable system frequencies (i.e., below 1 GHz), and in fact may be used with systems that operate above 1 GHz band in center frequency or bandwidth, to include without limitation so-called ultra-wideband (UWB) systems. For example, in one variant, high-bandwidth UWB signals imposed atop the traditional QAMs of the cable network are used to provide a high-speed data download capability for the content to be utilized at the subscriber's premises (e.g., applications or archived data).

Also, while certain aspects are described primarily in the context of the well-known Internet Protocol (described in, inter alia, RFC 791 and 2460), it will be appreciated that other types of protocols (and in fact bearer networks to include other internets and intranets) may be used to implement the described functionality.

Networks—

FIG. 1 illustrates a typical generalized content delivery network configuration with which the personal media delivery apparatus and methods may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized. For example, the headend architecture of FIG. 1a (described in greater detail below) may be used. The headend entities may be in further communication with an internet 111, thereby enabling access to the network (and content delivered therefrom) by non-legacy devices.

The data/application origination point 102 comprises any medium that allows data and/or applications (such as a VOD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

Figure 1A:
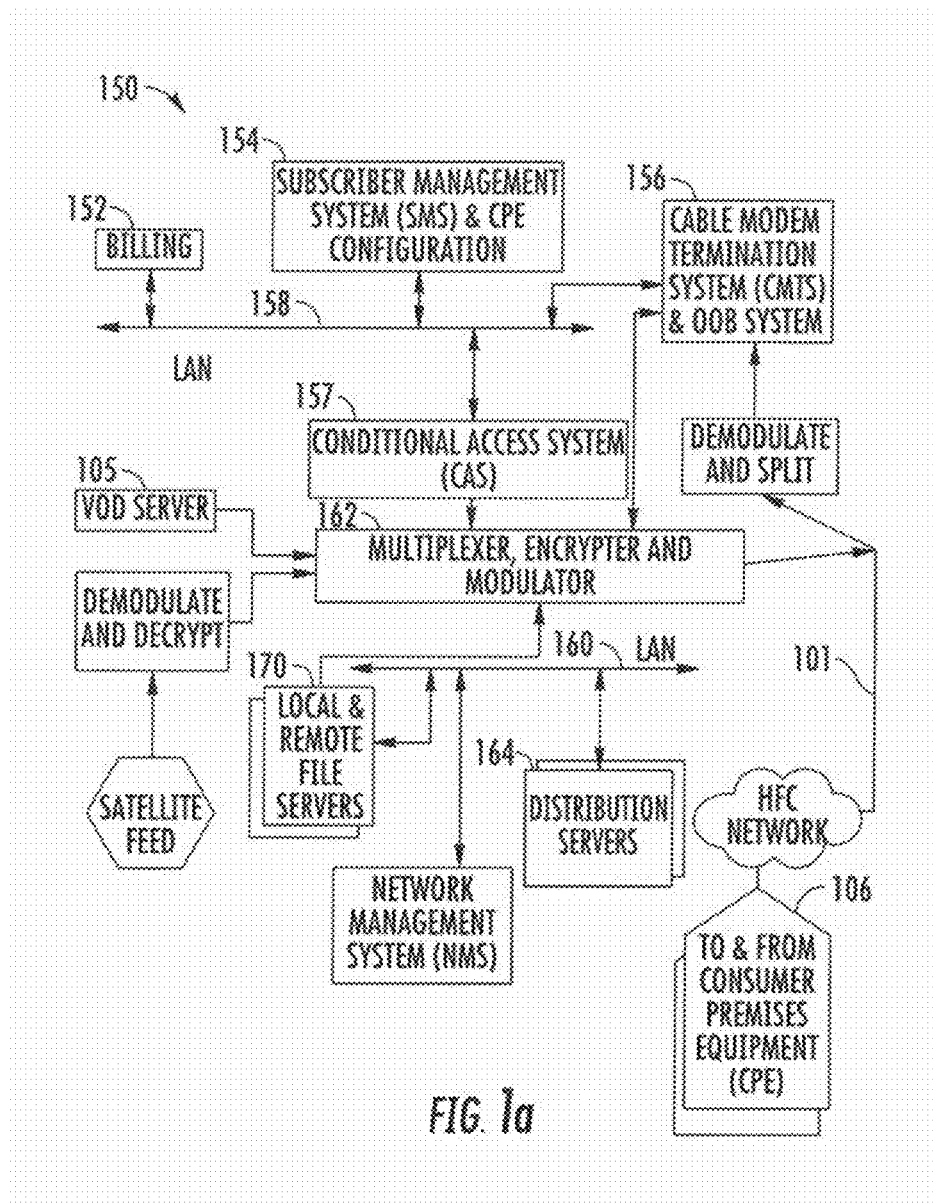
FIG. 1a is a functional block diagram illustrating one exemplary HFC cable network headend configuration useful with various aspects of the present disclosure.

Referring now to FIG. 1a, one exemplary embodiment of a headend architecture is described. As shown in FIG. 1a, the headend architecture 150 comprises typical headend components and services including billing module 152, subscriber management system (SMS) and CPE configuration management module 154, cable-modem termination system (CMTS) and 00B system 156, as well as LAN(s) 158, 160 placing the various components in data communication with one another. It will be appreciated that while a bar or bus LAN topology is illustrated, any number of other arrangements (e.g., ring, star, etc.) may be used.

It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs (FIG. 1b) via a variety of interposed network components.

Content (e.g., audio, video, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the system is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
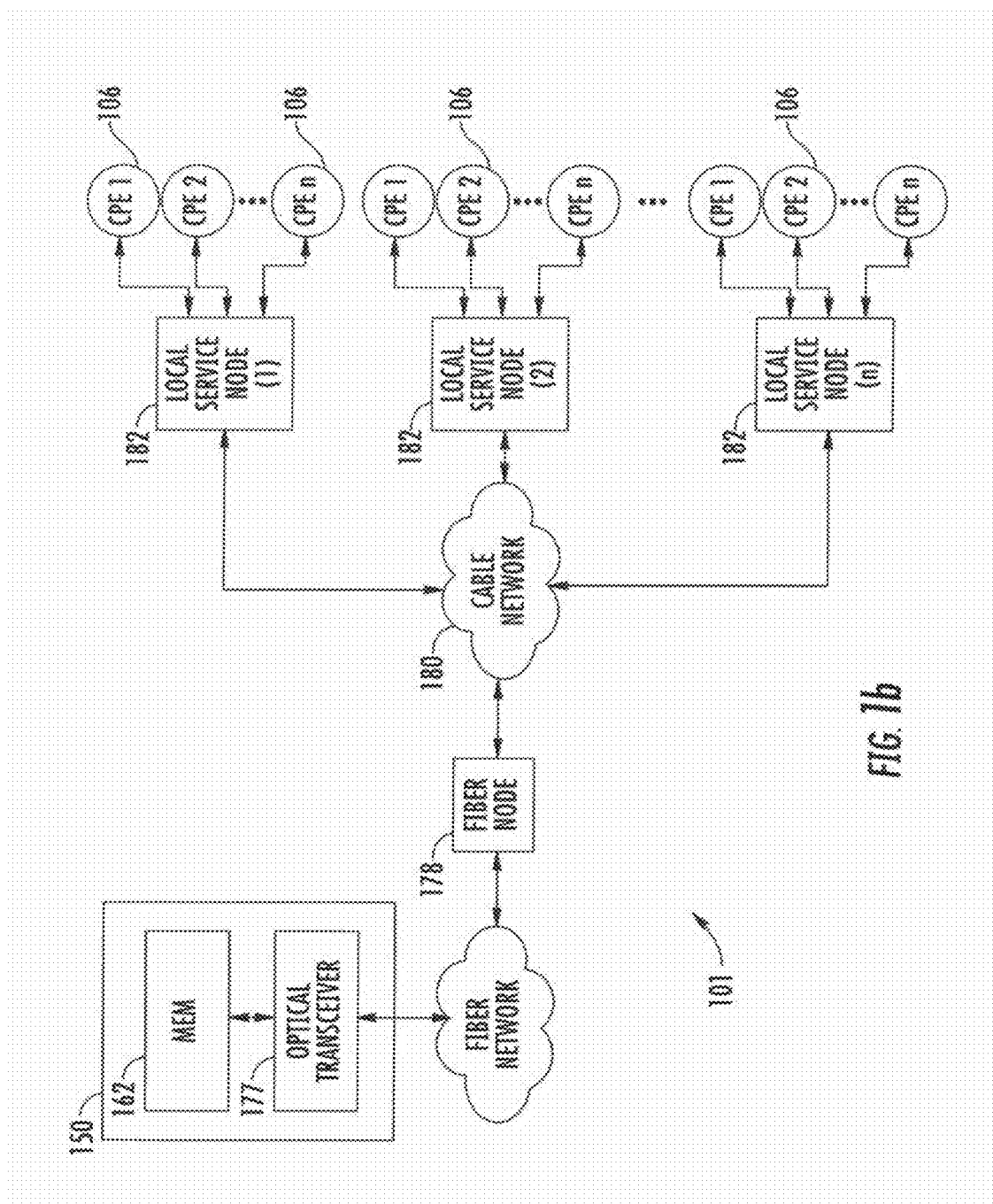
FIG. 1b is a functional block diagram illustrating one exemplary embodiment of a local service node configuration useful with various aspects of the present disclosure.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

Figure 1C:
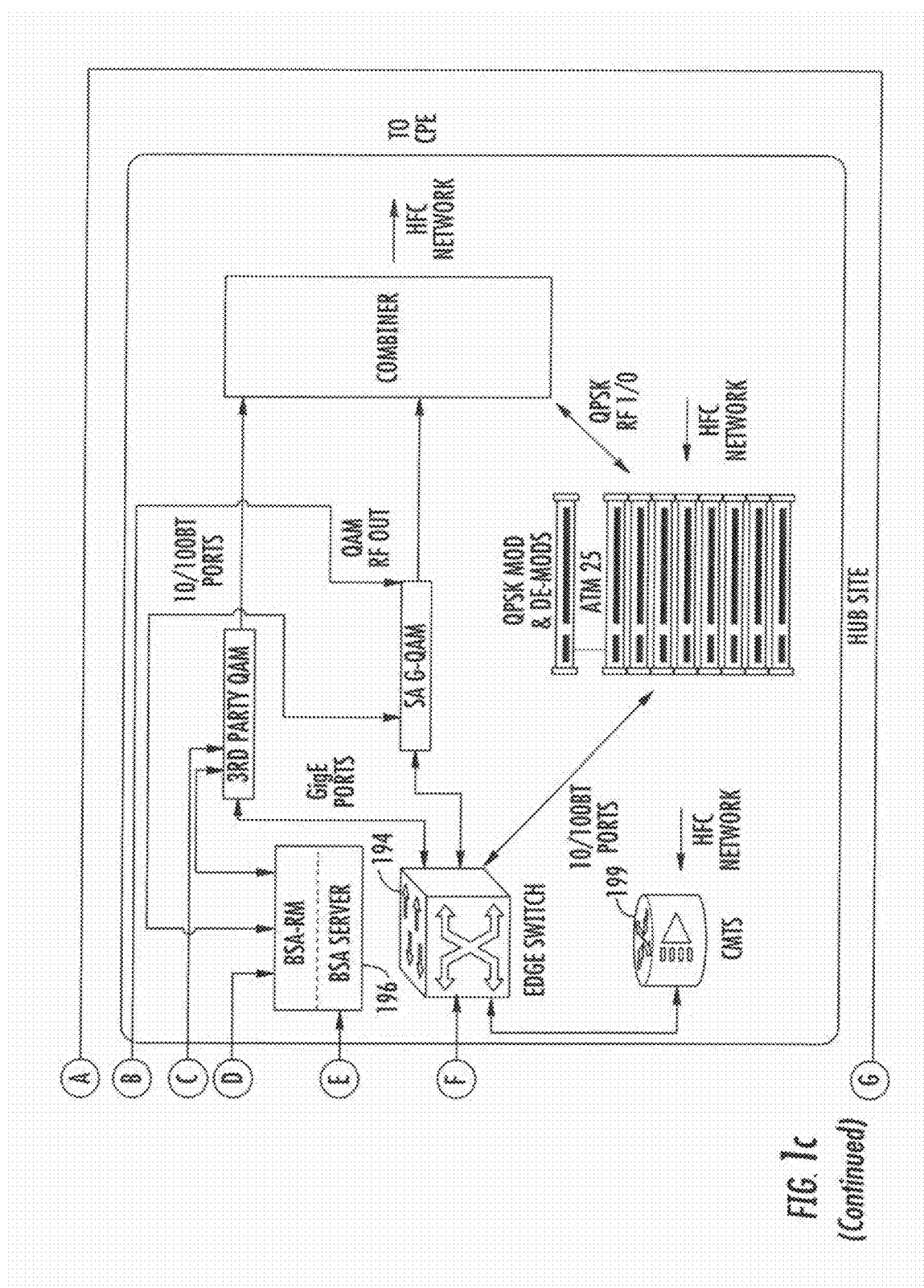
FIG. 1c is a functional block diagram illustrating one exemplary embodiment of a broadcast switched architecture (BSA) useful with various aspects of the present disclosure.

FIG. 1c illustrates an exemplary "switched" network architecture. While a so-called "broadcast switched architecture" or BSA network is illustrated in this exemplary embodiment, it will be recognized that the system is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", issued as U.S. Pat. No. 8,713,623 on Apr. 29, 2014, which is incorporated herein by reference in its entirety, describes one exemplary broadcast switched digital architecture, although it will be recognized by those of ordinary skill that other approaches and architectures may be substituted.

In addition to "broadcast" content (e.g., video programming), the systems of FIGS. 1a-1c (and FIG. 1d discussed below) can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets received from the CMTS 199 to the QAM modulator, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while the exemplary embodiments presented herein are described in the context of Internet services that include multicast and unicast data (e.g., using an Internet Protocol (IP) networking protocol over one or more transports), other types of services that include multicast transmission of data delivered over a network having multiple physical channels or even virtual or logical channels may be used. For example, switching between various physical channels that comprise a virtual channel, can itself be conducted according to the "switched" approach. As a simple illustration, if a first virtual channel is comprised of physical channels (e.g., QAMs) A, B and D, and a second virtual channel is comprised of QAMs C, E and F, a CM or other CPE can be configured to switch between the A/B/D and C/E/F virtual channels as if they were a single QAM.

"Packetized" Networks—

Figure 1D:
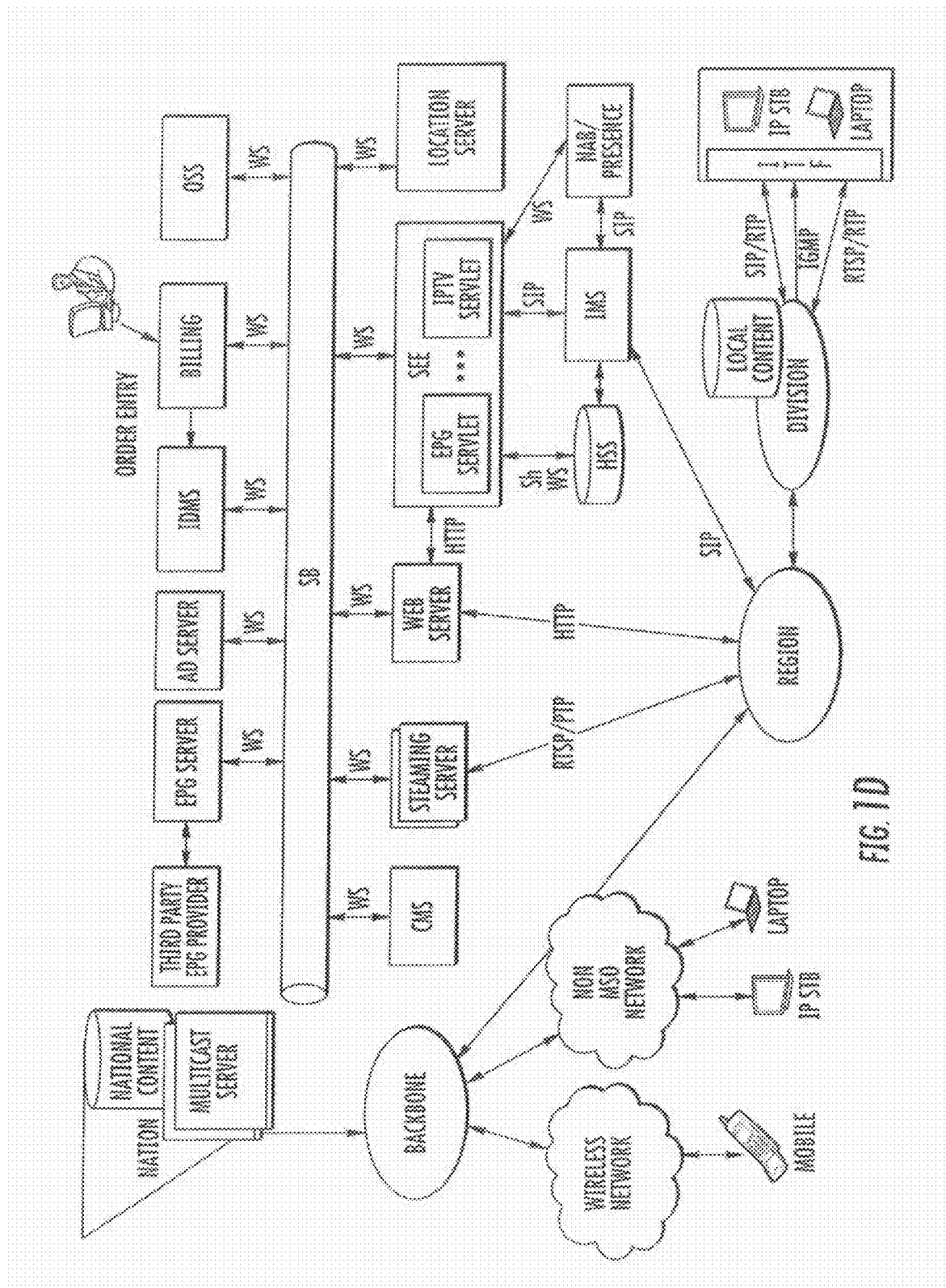
FIG. 1d is a functional block diagram illustrating one exemplary embodiment of a packetized content delivery network architecture useful with the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in co-owned U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which was filed as co-pending U.S. patent application Ser. No. 12/764,746 on Apr. 21, 2010 and published as U.S. Patent Application Publication No. 2011/0103374 of the same title on May 5, 2011, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

System Architecture—

Figure 2:
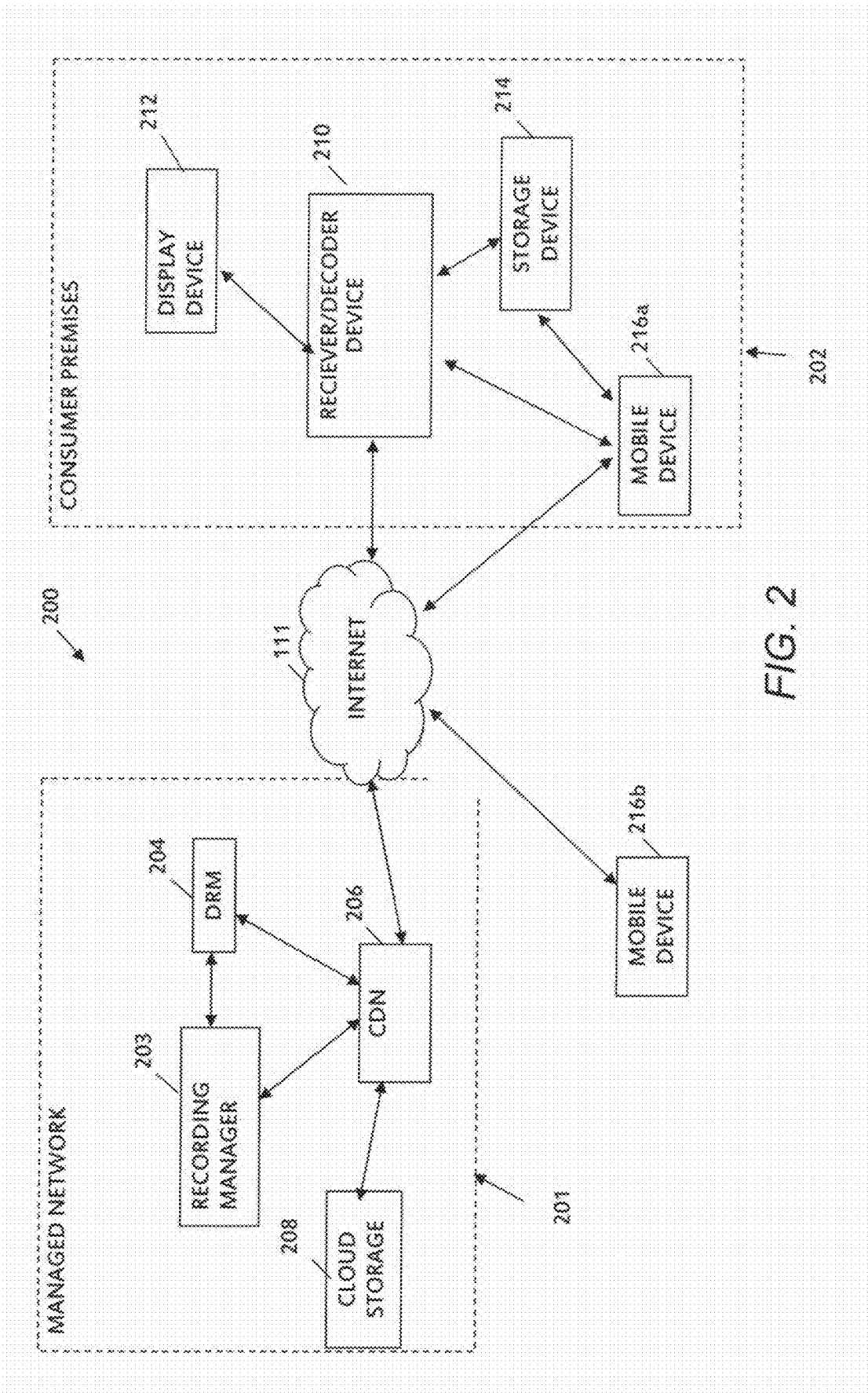
FIG. 2 is a functional block diagram of one exemplary embodiment of a system architecture for recording management in accordance with the present disclosure.

FIG. 2 is a functional block diagram illustrating an exemplary embodiment of the content distribution system architecture 200 according to the present disclosure. It will be appreciated that this architecture 200 may be readily integrated into the existing architecture of a cable television network (such as those shown in FIGS. 1-1d, or others), or alternatively used in conjunction with other types of networks (e.g., satellite networks, DSL networks, optical fiber networks, terrestrial wireless networks, hybrid fiber copper (HFCu) networks, etc.).

As shown in FIG. 2, the exemplary embodiment of the system architecture 200 generally comprises a consumer premises portion 202, and a managed network or MSO portion 201.

The consumer premises portion comprises at least a receiver/decoder device 210 and a display device 212. The receiver/decoder device 210 comprises any IP-enabled device able to stream data from e.g., the Internet 111. Examples of video receiver/decoder devices include Roku, Chromecast, WD Play, Slingbox, Netgear Push2TV, TiVo Stream, Vizio Co-Star, Amazon FireTV, etc., but it will be appreciated that the present disclosure is in no way so limited to such devices (or such types of device), and in fact may be implemented in any number of different configurations and/or form factors. The receiver/decoder device 210 (as further illustrated in the exemplary embodiment of FIG. 5 herein) is configured to generate and display a user interface, generate requests for access to content and scheduling requests, access and utilize metadata, and stream media content. The consumer premises may optionally include one or more storage devices 214 or other recording media.

Figure 6:
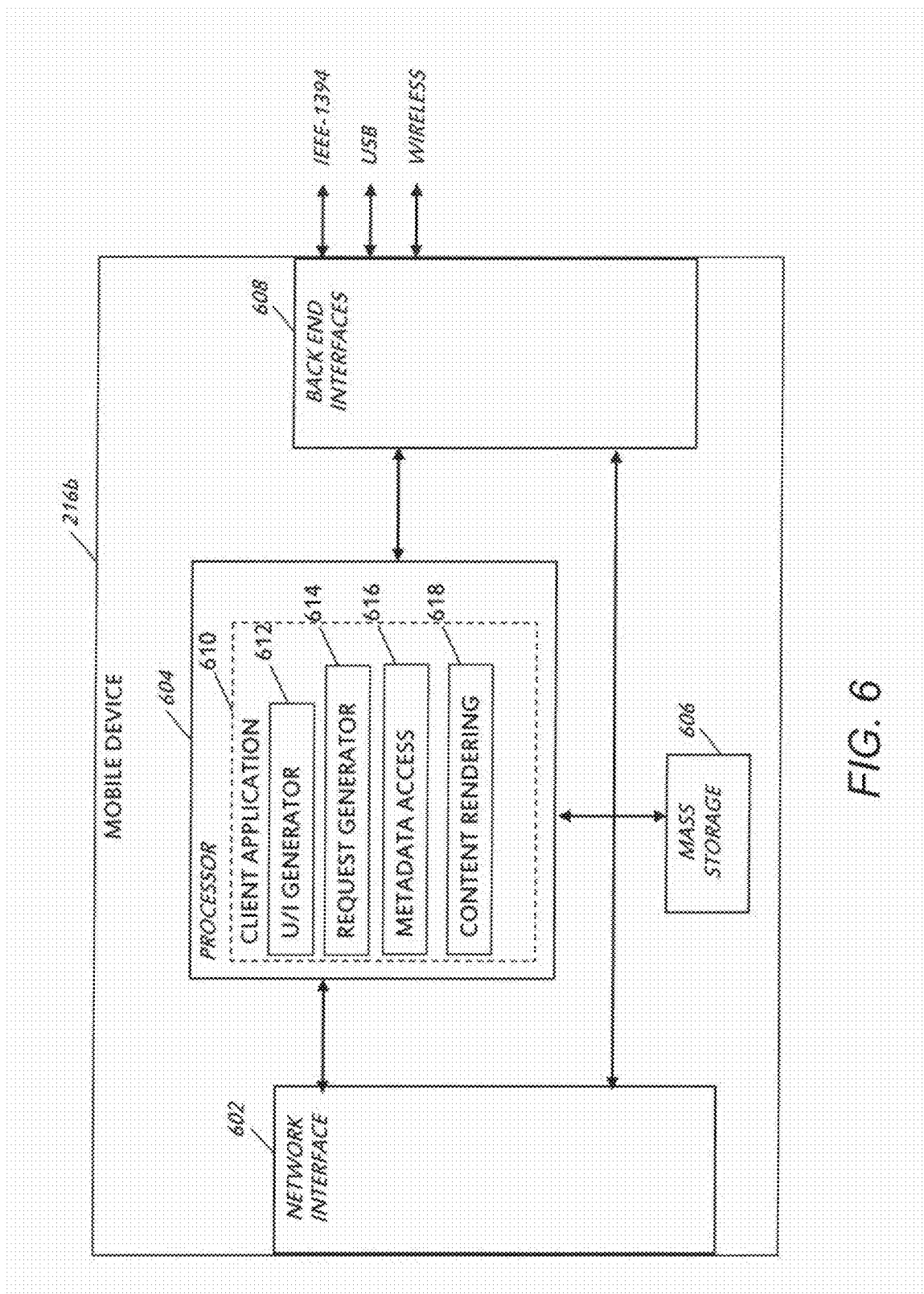
FIG. 6 is a functional block diagram of one exemplary embodiment of mobile device for use in accordance with the present disclosure.

FIG. 2 further illustrates a mobile device 216a for use within the consumer premises (the latter which may extend outside of the physical premises owned or occupied by the consumer). In this embodiment, the mobile device accesses the managed network via communication with the receiver/decoder device 210; the receiver/decoder device 210 is merely be a pass-through device or gateway for the mobile device 216a. According to this variant (as illustrated at FIG. 6, discussed in greater detail subsequently herein), the exemplary mobile device is configured to perform the same functions as the receiver/decoder device 210 discussed herein, e.g., generate and display a user interface, generate requests for access to content and scheduling requests (e.g., originated by the user of the mobile device), access and utilize metadata, and stream media content. Alternatively, the mobile device 216a may comprise a mobile portion of a distributed or client/server application which is configured to access and utilize functionality of the receiver/decoder device 210.

Alternatively, the mobile device 216b may access the managed network directly (e.g., via the Internet 111). According to this embodiment, the mobile device 216b (as illustrated at FIG. 6) is configured to generate and display a user interface, generate requests for access to content and scheduling requests, access and utilize metadata, and stream media content without the use of a separate receiver/decoder device 210.

The managed network portion of the architecture 200 comprises in one embodiment a plurality of managed entities including a recording manager 203 in communication with a digital rights management server 204 and a content delivery network (CDN) 206.

Figure 4:
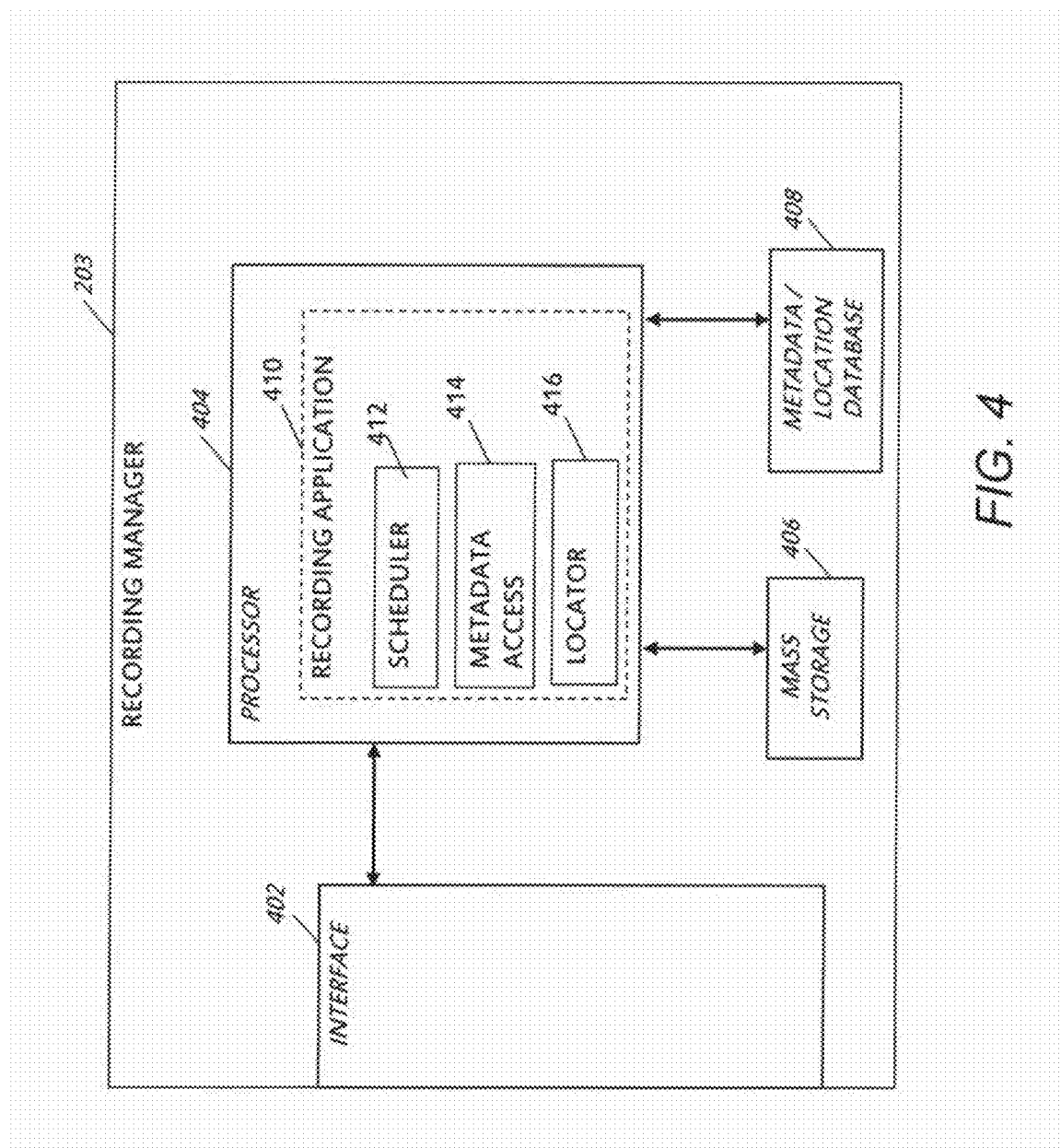
FIG. 4 is a functional block diagram of one exemplary embodiment of a recording manager for use with the present disclosure.

The recording manager 203 (an exemplary embodiment of which is illustrated at FIG. 4) manages and schedules recording of content on behalf of the consumer devices (such as the receiver/decoder device 210 and/or mobile devices 216a, 216b). The recording manager 203 runs one or more computer programs designed to receive requests to record packetized content from one or more consumer devices, and use metadata contained within the requests to cause a cloud storage entity 208 or premises storage device 214 to record the content at its scheduled date/time on a recording medium associated therewith. The recording manager 203 may therefore provide digital video recording (DVR) functionality to devices that would be otherwise incapable of causing a storage entity to schedule a recording and/or record content. That is, the recording manager 203 acts on behalf of a receiver/decoder device 210 or mobile device 216a, 216b to implement commands to record and schedule recordings at storage devices. To this end, a metadata access entity at the recording manager 203 utilizes information contained within the request to uniquely identify both the content and the requesting subscriber (and/or the requesting device). This information may be used for authentication/authorization, as discussed below, as well as to locate specific or dedicated portions of a common storage entity. Additionally, the metadata may be used to determine a date, time, and program identifier of selected program. A scheduler application at the recording manager 203 runs the necessary timers to "wake up" at a pre-determined date/time (as indicated in the metadata) and cause broadcast content, or content which is otherwise subject to scheduled delivery, to be transmitted to the storage entity for storage thereat (by identifying the content using the program identifier in the metadata).

The CDN 206 in one embodiment comprises a plurality of servers which serve content to consumers, including web objects (e.g., text, graphics and scripts), downloadable objects (e.g., media files, software, documents), applications (e.g., e-commerce, portals), live streaming media, on-demand streaming media, and social networks. The CDN 206 and/or recording manager 203 cooperate to manage content delivery, upload and storage (either at a premises storage device 214 or at the cloud storage 208). To this end, the CDN 206 may further comprise and/or be in communication with one or more cloud storage entities 208. As will be discussed elsewhere herein, cloud storage entities 208 may be utilized to store content and associate the stored content with individual ones of a plurality of consumers. Moreover, the premises storage 214 may in one embodiment, merely comprise a "back-up", whether temporary or permanent, of the network stored data.

In one embodiment, the cloud storage entities 208 may be of the type disclosed in co-owned U.S. patent application Ser. No. 13/888,224 filed on May 6, 2013 entitled "PERSONAL CONTENT SERVER APPARATUS AND METHODS", issued as U.S. Pat. No. 9,325,710 on Apr. 26, 2016, which is incorporated herein by reference in its entirety. As discussed therein, access to content (e.g., program viewing) delivered over a content-based network is permitted to e.g., the receiver/decoder device 210 and mobile device 216a, 216b via other networks or communication channels. For example, in the context of a cable television network, programming or other content delivered to a subscriber over the cable network can be accessed via other (secondary) networks such as the Internet 111 (or LANs/WANs/MANs, a wireless service provider (WSP) network, cellular service provider (CSP) network, or even a satellite network). In one embodiment, the aforementioned recording manager 203 and/or CDN 206 cooperate to cause the cloud storage 208 device to store content associated with a particular subscriber, and distribute the stored content to one or more remote requesting locations via the Internet 111.

The requested content advantageously may comprise video, audio, gaming content, software applications, stored data, or any other form of data which can be delivered over a network. On-demand content delivery (including "trick mode" and similar functions) is also optionally supported through the establishment of a session between the remote client device (such as e.g., the receiver/decoder device 210 or mobile device 216a, 216b) and the CDN 206 and control using extant session and stream control protocols (e.g., LSCP).

Moreover, broadcast or "live" content can also be accessed via the secondary network approach herein disclosed. For example, one variant allows the broadcast streams to be switched via the headend to the remote node via the secondary network (e.g., Internet, WAN, CSP network, etc.). In another variant, the content server function of the recording manager 203 and/or CDN 206 is placed at a hub site of a broadcast switched architecture (BSA), thereby allowing for a close coupling between the hub switch state and the remote delivery for individual subscribers.

It is further noted that certain portions of the cloud storage 208 may be dedicated to a particular subscriber or consumer; content stored at the dedicated storage space under this model is not accessible to any other subscribers or consumers which share use of the cloud storage entities 208. For example, the recording manager 203 may be accessible by the receiver/decoder device 210 and/or mobile device 216a, 216b which partitions the cloud storage 208 by individual subscriber or device (using e.g., metadata in an initial request to record to uniquely identify the subscriber and/or device). A user may access the "network DVR" (i.e., cloud storage 208) by accessing the recording manager 203 via the Internet 111. As will be discussed in greater detail elsewhere herein, the recording manager 203 may comprise a database of information identifying particular locations within the cloud storage 208 that are associated to specific subscribers and/or devices. Partitioning the cloud storage 208 ensures that content may not be accessed by users other than the user which caused it to be recorded/stored, thereby ensuring copyrights of the content are protected. The recording manager 203 and/or CDN 206 determines remote access privileges to the cloud storage 208 once content has been placed on the "network DVR" or a "virtual DVR" maintained for the subscriber, thereby ensuring that a plurality of remote client devices (e.g., receiver/decoder devices 210 and mobile devices 216a, 216b) may share a common cloud storage device 208 in a manner that is consistent with the copyright rules set forth by the content source. One such system is discussed in co-owned U.S. patent application Ser. No. 13/888,224 filed on May 6, 2013, entitled "PERSONAL CONTENT SERVER APPARATUS AND METHODS", issued as U.S. Pat. No. 9,325,710 on Apr. 26, 2016, which is incorporated herein by reference in its entirety.

It may be desirable under certain circumstances (e.g., for certain business models, in order to address security or legal/copyright issues, etc.) to provide the user with some degree of "ownership" or control of the MSO network facilities (e.g., portions of the cloud storage 208), whether on a short-term or long-term basis. As such, the user or subscriber may in certain implementations contemplated herein: (i) lease or even own equipment within the network operator's infrastructure or facilities; and/or (ii) extend a virtual control boundary around one or more components or portions of the network operator's equipment or infrastructure.

In the instance content is stored at the cloud storage device 208, the receiver/decoder device 210 or mobile device 216a, 216b will then requests access to the content via submitting a request to the recording manager 203. The recording manager 203 uses metadata contained within the request to associate the request with a particular subscriber, device, and/or content, and identify a location at the cloud storage 208 where the content is stored. The location is provided to the requesting device. In one specific example, the recording manager 203 maintains a database which associates metadata relating to particular content and/or particular subscribers and/or devices to a uniform resource locator (URL) specifying the location of the content at the appropriate storage device is provided to the requesting device, however other mechanisms for identifying the location may be utilized with equal success. According to this example, a particular content element is associated to a particular consumer via metadata obtained from the consumer's original request to store the content, and the content is stored at a dedicated storage location specified by a particular URL.

Alternatively, as will be discussed below, content may be stored at a storage device associated with the consumer premises (e.g., storage device 214). According to this embodiment, content may be accessed directly by the receiver/decoder device 210 in communication with the storage apparatus 214. A mobile device 216a may also access the premises storage apparatus 214 directly or via the receiver/decoder device 210 with appropriate authentication thereto (such as via formation of a trusted domain, such as that described in co-owned U.S. Pat. No. 8,520,850 entitled "DOWNLOADABLE SECURITY AND PROTECTION METHODS AND APPARATUS" and issued on Aug. 27, 2013, which is incorporated herein by reference in its entirety).

The copyrights of the content stored either at a cloud or at a consumer premises are protected via the DRM server 204, which in one embodiment, communicates with the recording manager 203 and the CDN 206 to control a user's rights to receive, playback, modify, record, and/or distribute content. The DRM server 204 may apply copy protection, copy prevention, and/or copy control rights to content prior to the content being delivered and/or stored (at the cloud or at consumer premises storage).

The DRM server 204 may be further configured with logic to mask or tie delivery of protected content with other requirements, such as where both a free tuner and the permitted viewing start time falling within a prescribed temporal window are required (i.e., viewing or access is valid only for a certain "aging" period), or where the user acknowledges a splash screen or comparable mechanism acknowledging the copyright of the content to be viewed (akin to a physical DVD, where the user's DVD player controls are ineffective during the copyright notice portions), and the restrictions on its use. Masking may also be based on network status or bandwidth availability, such as where the session will not be instantiated until sufficient bandwidth is available to provide a sufficiently high assurance of completing the streaming. The DRM server 204 also provides the rights associated with copy protection, i.e., the DRM server 204 identifies whether a requesting subscriber has the rights to make one copy or multiple copies, whether the content be "moved" to a portable device for offline viewing, and also determines whether the viewing of content is permitted on a specific device type. The DRM server 204 is also responsible for the management of the keys required for decryption of the content.

It is further appreciated that various other entities of the exemplary managed network may be utilized to ensure that content is provided only to authorized and authenticated requestors. These entities may be located at, or in communication with, the CDN 206 and/or recording manager 203.

In one embodiment, in order for the managed or host network to ensure that the requesting device (e.g., receiver/decoder device 210 and/or mobile device 216a/216b) is authorized to receive content, one or more authentication checks must be performed prior to delivery of the content and the content key thereto. In one variant, one or more of the following three (3) checks may be utilized. A first authentication check determines whether the user is a registered user/subscriber of the MSO or managed network. In one implementation, this includes requiring the user of the IP-enabled device (e.g., receiver/decoder device 210 and/or mobile device 216a/216b) to log-in to the services, such as via the Internet 111. This may be accomplished by requiring him/her to establish a login identity and password, and/or assigning the user a globally unique identifier (GUID). This unique information is stored at an MSO entity such as an entitlements or authentication server (not shown), and when the user logs into a website (such as a common login application (CLA) maintained by the MSO and associated to the recording manager 203), the information is accessed and compared to information the user provides to login. If valid login information is entered (i.e., the information provided matches the stored information for that user GUID), then a session is created between the recording manager 203 and the user device.

A second authentication check determines whether the requesting device is within or associated to a home network or other premises serviced by the MSO. In one implementation, this second authentication check includes determining whether the IP address of the cable modem/gateway to which the receiver/decoder device 210 and/or mobile device 216a request is associated is among the cable modems or gateways registered to the MSO (whether leased or otherwise).

A third authentication check determines whether the user himself is authorized or entitled to view the content; i.e., irrespective of the other checks. This third check may include determining a subscription level of the user (or whether a user has provided consideration to the MSO for gaining access to the content, such as on a pay-per basis), and applying an appropriate filter to the content which can be requested thereby based on the subscription or payment. This check of user "entitlement" is to be distinguished from the first check described above (i.e., is the user a registered network user/subscriber, irrespective of his/her entitlement to view a given content element).

With respect to the second authorization check to ensure that the requesting device (e.g., receiver/decoder device 210 and/or mobile device 216a) is "behind" a registered cable modem or gateway, in one particular embodiment, an integrated database management system (IDMS) having a service-oriented architecture (SOA) and a MAC-to-IP (MAC2IP) address database is utilized. Accordingly, the requesting device provides to the network a MAC (media access control) address of the cable modem/gateway with which it is associated. In one instance, the MAC addresses of all authorized cable modems are known to the managed network, such as by maintaining a list thereof at the IDMS. The MAC address is cross-referenced in the MAC2IP database to determine whether it corresponds to an IP address assigned by the MSO network. In other words, the MAC2IP database contains a listing of information regarding all of the cable modems registered to receive content via the MSO-operated content distribution network. The list is consulted when a request for content is received, and if it can be determined that the requesting device is associated to an authorized cable modem/gateway, the content is provided thereto (subject to any other potential limitations/checks that may be imposed).

In one variant, the aforementioned entitlements check (i.e., ensuring that the requesting device is behind a recognized cable modem or Wi-Fi hotspot) is performed according to the methods and apparatus discussed in co-owned U.S. Pat. No. 8,341,242 entitled "SYSTEM AND METHOD FOR MANAGING ENTITLEMENTS TO DATA OVER A NETWORK" and issued on Dec. 25, 2012, which is incorporated herein by reference in its entirety. As discussed therein, entitlement to content residing on a server is determined by e.g., the computing device operated by a subscriber generating a request for access to a requested content residing on a content access provider server. The subscriber has an account with a multi-channel video program distributor (MVPD), and the account comprises subscription information indicative of the services provided by the MVPD to the subscriber. The content request is received by the content access provider and forwarded to an entitlements server. The entitlements server determines whether the subscriber is entitled to receive the requested content based on the subscription information, and sends an access granted message to the content access provider server when the subscriber is entitled to receive the requested content.

In yet another embodiment, entitlements are determined via a geographic location of an MSO-managed public hotspot. According to this embodiment, the previously discussed MAC2IP database is utilized to determine the MAC address of the hotspot given its IP address. Alternatively, or in addition, authentication of the user or subscriber may be performed to ensure services are provided appropriately (such as according to a geographic location to which the subscriber is associated).

Referring again to FIG. 2, the consumer premises portion 202 of the network architecture 200 receives content from the managed network via the Internet 111. In one exemplary embodiment, the content comprises Internet Protocol (IP) packetized content received over the Internet. In another embodiment, the packetized content may be received at the consumer premises from the managed network via e.g., the HFC network 101 (as discussed above).

In one embodiment, content delivery is accomplished according to the methods disclosed in co-owned U.S. patent application Ser. No. 12/834,796 entitled "APPARATUS AND METHODS FOR CONTENT DELIVERY AND MESSAGE EXCHANGE ACROSS MULTIPLE CONTENT DELIVERY NETWORKS" and filed on Jul. 12, 2010, now issued as U.S. Pat. No. 9,357,247 on May 31, 2016, and co-pending U.S. patent application Ser. No. 12/834,801 entitled "APPARATUS AND METHODS FOR CONTENT MANAGEMENT AND ACCOUNT LINKING ACROSS MULTIPLE CONTENT DELIVERY NETWORKS" filed on Jul. 12, 2010, now published as U.S. Patent Application Publication No. 2012/0008786 on Jan. 12, 2012, each of which is incorporated herein by reference in its entirety. As discussed therein, protected content is provided to subscribers of a managed network (e.g., MSO network such as cable, satellite, or HFCu) via a content source accessible to the subscriber via an internetwork (e.g., the Internet 111). In one embodiment, a user accesses a website or other network portal which enables communication to the recording manager 203, and requests content. Alternatively, the recording manager 203 may be located outside the managed network, e.g., at a third party or remote location (not shown). In order to protect the content, authentication and entitlement checks are performed, such as those discussed above (e.g., (i) authenticating the user as a subscriber to the MSO, (ii) determining whether the requesting device is within or associated to a home network or other premises serviced by the MSO, and/or (iii) determining whether the subscriber's service level (subscription level) permits or entitles viewing of the requested content).

In one exemplary implementation, the aforementioned authentication comprises enabling the user to log into a third party-managed recording manager 203, such as by establishing a log-in identity and password which are stored at the third party site. Once logged in, requests to view content are forwarded from the remote recording manager 203 to an appropriate managed network entity for authentication/entitlements checks. Moreover, a platform for the user to log-in to the MSO site (e.g., a virtual MSO interface) may be provided.

In one variant, the third party recording manager and MSO subscriber accounts for a particular user may be linked or "federated". To accomplish this, a given user will have MSO-specific information regarding its identity (such as login information for the MSO, GUID, etc.) and/or information regarding its subscription level and other service details stored at the third party site, or other entity accessible to the third party recording manager without requiring consultation with the MSO. Messages received from the MSO representing permission for the user to access content may also be stored at the third party site. The third party recording manager may later reference this information when subsequent requests for content are made by the user, and thereby provide faster and more efficient service. Methods for unlinking or de-federating a user's account in the programmer and MSO sites may also be provided as discussed in the previously referenced co-owned, co-pending U.S. patent application Ser. No. 12/834,796.

Determination of whether the subscriber's service level (e.g., subscription level) permits viewing of the requested content is, in one embodiment, performed at the managed network in response to receiving a request for content. In one exemplary implementation, one or more MSO entities utilize the user login information to determine the identity of the user as a subscriber, and then determine the details of the service to which the subscriber is eligible (e.g., has paid for/subscribed to). The identity of the user may also be determined at least in part via a device ID associated with the request (e.g., MAC, IP address, etc.), which can be correlated to one or more subscriber accounts by the MSO.

The MSO generates and transmits messages to the third party recording manager indicating whether or not the user should be permitted access to content (and optionally what restrictions if any apply) based on the authentication and authorization determinations. In one variant, the remote recording manager may store a so-called "entitlement cookie" or other data element which may be referred to at future instances wherein the subscriber requests content. The entitlement cookie may comprise a stored MSO message indicating the subscriber is entitled to access the content, which may be relied upon for, e.g., a certain period of time or number of transactions. Once it is determined that a subscriber is entitled/authorized to access content, the recording manager may communicate to the appropriate entities to have the content stored or recorded and to have recorded content delivered.

In other variants, the MSO enables the recording manager 203 to enforce security or rights management protection (e.g., DRM, encryption keys, etc.) on content authorized for delivery, such as by pre-positioning information enabling this protection (and specific to the requesting subscriber) at the service provider.

Similarly, the service provider may pre-configure the requested content based on one or more configuration parameters associated with the requesting device (e.g., codec support, DRM support, display capabilities, etc.).

Delivery of the requested content may occur via any of a number of different models, including for example (i) delivery back over the MSO's infrastructure, and (ii) delivery over non-MSO operated infrastructure, such as the Internet 111, wireless link, etc.

As discussed above, in one variant, the user or subscriber may lease or purchase storage space (e.g., cloud storage 208) from the MSO or a proxy such as a designated storage provider with extant infrastructure. Such lease or purchase may be for a period of time (or number of uses, etc.), for a given storage allocation (e.g., until 100 Gb has been used, at which point it can be optionally replenished), or even permanent if desired. To this end, the MSO or other network operator may utilize a highly modular architecture, such that the operations of the leased space/equipment for respective subscribers are largely or completely separated from one another. In one variant, the MSO maintains the leased/owned equipment (including physical security thereof), and operates the equipment at the behest of the owner. For example, the MSO in this variant determines the configuration of the device, performs software upgrades, performs periodic maintenance, controls encryption/decryption of the stored content, regulates access thereto, etc.

In another variant, a virtual control boundary is further constructed around the subscriber's leased or purchased equipment, thereby allowing them to be in direct control of all aspects of the operation and access of their equipment. For example, one embodiment employs a software application disposed at the client's receiver/decoder device 210 or mobile device 216a, 216b which communicates with a corresponding entity (e.g., application or portion) at the recording manager 203 that controls the operation of the leased/purchased equipment. In this capacity, the MSO's equipment is in a very real sense in the possession and under the control of the subscriber, albeit being physically located at a place remote from the subscriber's premises (e.g., the headend of the cable network). In another variant, the cloud storage 208 apparatus are disposed at a local hub site or other node even more physically proximate to the user's premises, thereby distributing the "load" of delivering the content out to the edge of the MSO's infrastructure to (i) reduce core network load, (ii) reduce latency, and/or (iii) potentially make the cloud storage more failure tolerant.

In another embodiment, the virtual control boundary may be constructed around a group of subscribers. While network storage space is allocated to individual subscribers, other subscribers or the network operator may be able to access, retrieve and/or upload content from this assigned space pursuant to various business models. For example, in response to a request for a content item from a first subscriber, the MSO may access/retrieve that content item stored on the network storage of the second subscriber. This may prove useful in situations where a local copy of the content item is not easily available to the headend, or for the purposes of saving storage space when the same or similar content item (i.e., same title, same personalization, same encoding etc.) exists on the network storage 208. Alternatively, the MSO may grant access to the first subscriber to access or download content stored on the second subscriber's network storage space. Granted access may be limited to specific content (i.e., the content item that was requested) or limited in duration.

In one variant, subscribers may be grouped according to common characteristics and allowed varying levels of access to other subscribers' network storage space within the same group. For example, subscribers could be grouped according to subscription type (e.g., "friends and family" versus "individual"), geographic location, node location, or similarities in requested content. Subscribers belonging to the group may access/retrieve content that is stored on the network storage space of other group member's network storage space or network storage space that is specifically allocated for the group.

It will be appreciated that various business models may also be constructed around such "virtual possession" schemes, including for example where the user or subscriber can themselves specify or configure the equipment that they lease or own, much like one currently configures a PC or laptop from a manufacturer at time of purchase. A user can also be provided with the capability of changing or upgrading their equipment, such as for more storage space, different codecs, network interfaces, conditional access, encryption/authentication schemes, indigenous processing or signal conditioning capability, etc.

The virtual storage device 208 can also be made part of a business paradigm; e.g., wherein the user pays a fee (such as on a per-Tb used) or subscribes for X terabytes (Tb) of storage space for a given period of time.

It will also be appreciated that copyright-protected content may be shared across multiple unrelated "eligible" users of the network. For example, suppose CPEs A, B, and C (each associated with different subscribers at different premises) all request to record specific content from the network. Under one implementation, the content is stored to a network storage location (e.g., cloud storage 208). The storage "location" may comprise a common storage area or server (e.g., all three users utilize the same storage), or three (separate) storage areas for each of the users. Hence, any number of logical and/or physical storage partitioning schemes may be utilized consistent with the present disclosure. In one paradigm, all three users in this example maintain separate, independent storage and access thereto. Alternatively, the users may employ a common storage/access approach, such as where each of the users can access a common copy of the content (assuming it is identical).

This latter approach economizes on storage requirements in the cloud, since only one copy need be maintained (versus three) in this example. Hence, in one variant, the architecture 200 of FIG. 2 is configured such that it includes logic which identifies such commonalities (especially those occurring within a prescribed temporal window), and leverages them, such as to decrease latency for the users. For instance, where the CPE A, B and C of the prior example all request to record content element X within a few minutes of each other, the first device (say, CPE B) initiates its request first, and the remaining CPE A and C requests to record the same content are disregarded as being duplicative of functions already scheduled to be performed or being performed. In such case, the second requests for the same content are handed off to storage locations for delivery therefrom.

Likewise, a single cloud-based copy of the content can be logically "interlocked" between two or more users (such as by logic within the recording manager 203) such that if the content is being accessed by one eligible user, it cannot be accessed by another until the first has completed it use (this concept will be discussed in further detail elsewhere herein).

Moreover, where the demand for the content from the network-side storage element will not be immediate, upstream assets can further be optimized through "opportunistic" use of these assets; e.g., a "trickle" and/or "bursty"

delivery as time/resources permit, especially where other content or data delivery is more critical, has more stringent QoS requirements, etc.

Exemplary Methods—

Figure 3A:
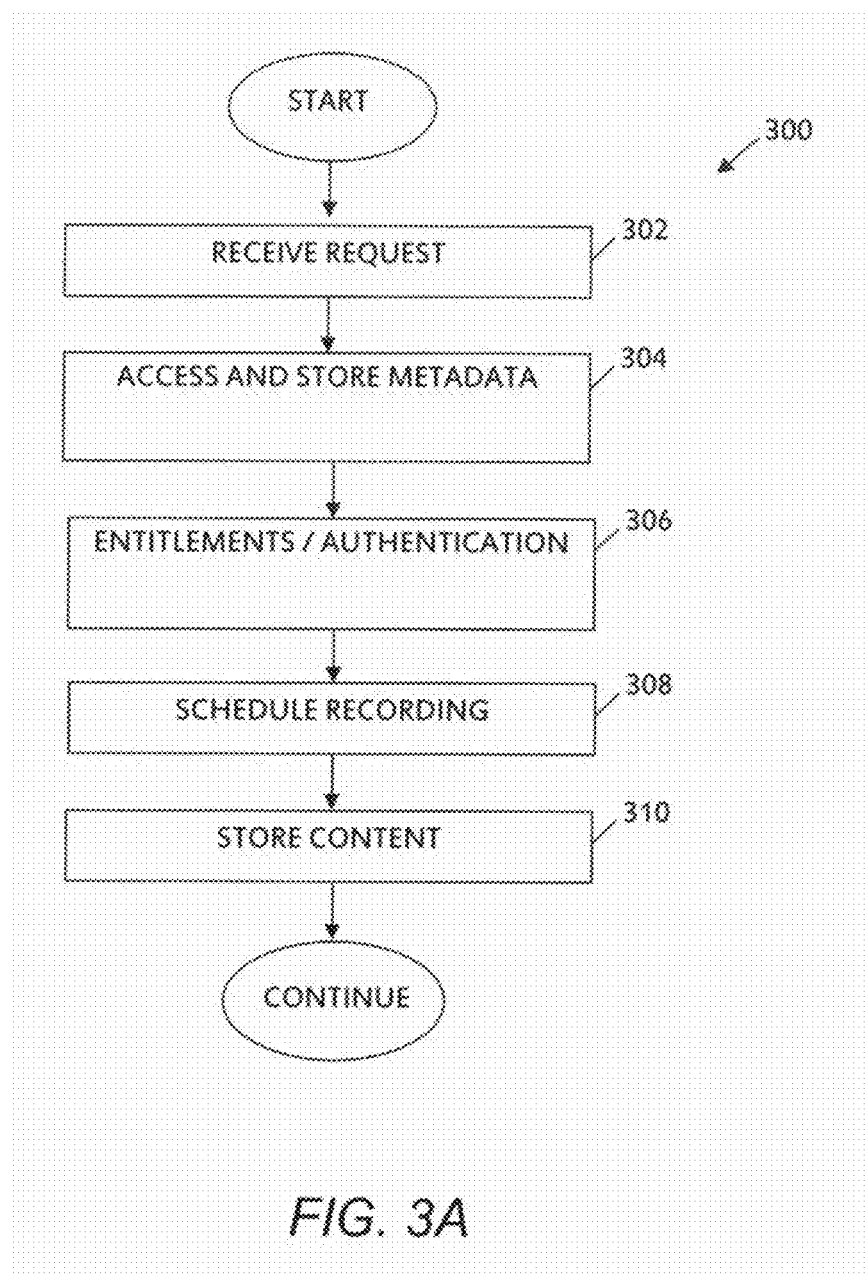
FIG. 3a is a logical flow diagram illustrating one embodiment of a method for enabling data and/or content recording management in accordance with the present disclosure.

Referring now to FIG. 3A, an exemplary embodiment of a method 300 for enabling data and/or content recording management is illustrated. As shown, the method comprises first receiving a request to record content (step 302). The request may be received at the recording manager 203 from any device capable of communicating to the recording manager 203 via the Internet 111 or via the managed network 101, or alternatively via an interposed proxy or other entity. The request to record content may therefore be received from not only devices capable of streaming packetized content (such as the receiver/decoder device 210 and mobile device 216a, 216b), but also from legacy (e.g., non-IP enabled) devices. It is apparent that, in the event the request is transmitted from a non-IP enabled device, the content may not later be streamed thereto. That is, the legacy devices, though capable of causing the recording manager 203 to schedule a recording, will not be capable of actually receiving and/or displaying the content. In other words, these devices are able to schedule recordings via the recording manager 203, actual content rendering being provided via a receiving/decoding device 210.

In one embodiment, the request includes metadata that uniquely identifies the subscriber and/or the requesting device (e.g., the receiver/decoder device 210 or mobile device 216a, 216b), and that identifies the requested content. Per step 304, the recording manager 203 accesses and stores the metadata contained within the request.

The metadata is used by the recording manager 203 at step 306 to determine the authorization and entitlements of the requesting device by using the metadata to: (i) determine whether the user is a registered user/subscriber of the MSO or managed network; (ii) determine whether the requesting device is within or associated to a home network or other premises serviced by the MSO; (iii) determine access to content based on a subscription level of the user; and/or (iv) determine the device type (including determining whether the requesting device is a legacy device in which case delivery will be provided to another non-legacy device).

Regarding the first check, in one embodiment, this is accomplished via identification of a GUID or other unique identifier (within the metadata) assigned to the device and provided thereto by the managed network. Alternatively (not shown), a further process requiring log-in information (including an identifier and password combination for example) must be completed. The recording manager 203 checks the provided GUID and/or log-in information against a database of stored subscriber information. The subscriber database or list may be provided to the recording manager 203 from the managed network (and updated periodically), such as from a billing entity or the like. Alternatively, the list or database may be held at an entity of the managed network, and the recording manager 203 simply queries the appropriate device using the metadata in the request. When the user is validated as a subscriber (i.e., the information provided matches the stored information for that user), then a session is created between the recording manager 203 and the requesting device.

The second authentication check performed with the aforementioned metadata comprises determining whether the requesting device is within or associated to a home network or other premises serviced by the MSO. This may be accomplished in one variant by verifying that the IP address of the cable modem/gateway to which the receiver/decoder device 210 and/or mobile device 216a request is associated is among the cable modems or gateways registered to the MSO (whether leased or other). Again, a list of approved cable modem/gateway IP addresses may be provided to the recording manager 203 or merely accessible thereby (yet stored elsewhere in the network).

In another variant, association of a user device (e.g., mobile device) with a preordained or authorized access point (e.g., Wi-Fi AP, cellular base station, etc.) can be used as a basis of authentication. For instance, the MSO or content provider may rely on or "piggyback" off the authentication/access control functions of the cellular or WLAN service provider to ensure that the user device is associated in an authorized fashion. See, e.g., co-owned U.S. patent application Ser. No. 11/258,229 filed on Oct. 24, 2005 and published as U.S. Patent Application Publication No. 2007/0094691 on Apr. 26, 2007, which is incorporated herein by reference in its entirety, which describes exemplary techniques for such cooperation between a managed network and other network service provider.

Alternatively (or in addition), the metadata may be used by the recording manager 203 to determine whether the user himself is authorized or entitled to view the content. As with the other authorization checks disclosed above, this may be accomplished by comparing information in the metadata to known or accessible information indicative of the various subscription levels and content to which each subscription level is approved to access.

Figure 3B:
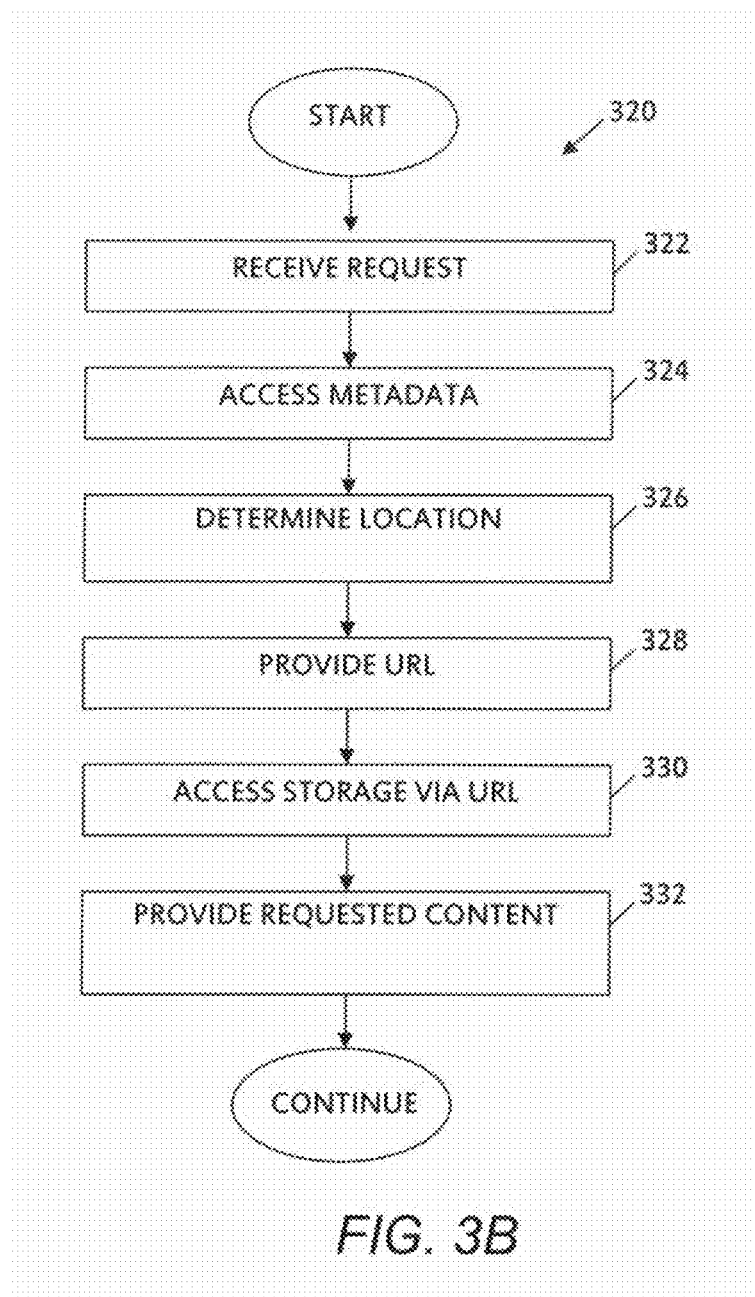
FIG. 3b is a logical flow diagram illustrating one embodiment of a method for enabling access to stored data and/or content in accordance with the present disclosure.

It is further appreciated that the recording manager 203 may omit the herein described entitlement/authentication step (step 306) and proceed instead to schedule a recording (step 308) without a determination of any or all of the aforementioned checks. Rather, the recording manager 203 or other entity may opt instead to make the authentication and/or entitlements verifications upon a users request to access stored content (as will be discussed with respect to FIG. 3b). Alternatively, these checks may be performed both when the request to record is made (step 302) and when a request to access recorded content is made (FIG. 3b).

As noted above, the metadata is also stored (step 304) at a database associated with the recording manager 203. This database comprises information linking metadata regarding a subscriber and/or subscriber device to particular content and to a location at which the content is stored (or will be stored) in a storage entity (such as the cloud storage 208 or premises storage 214). The recording manager 203 cross-references this database to fulfill requests for stored content (as discussed in FIG. 3b below).

At step 308 of the method 300, information contained in the request (e.g., metadata) is utilized by the recording manager 203 to schedule a recording. Specifically, the metadata contained in the request in one variant comprises information which is used to determine a date, time, and program identifier of the selected program. A scheduler application at the recording manager 203 runs the necessary timers to "wake up" at a pre-determined date/time (as indicated in the metadata) and cause broadcast content, or content which is otherwise subject to scheduled delivery, to be transmitted to the storage entity for storage thereat (step 310) by identifying the content using the program identifier in the metadata.

In one embodiment, the recording manager 203 may provide location information for the stored content to the device which requested to have the recording scheduled. That is, rather than requiring the device to (subsequent to the completion of recording) request access to the recorded content, the device may be provided with a URL or other identifier of the location at which the content will be stored (not shown). This may be accomplished by communication of the recording manager 203 to the storage entity (either cloud storage 208 or premises storage 214) to bookmark or reserve a location threat for storage of the content at the appropriate date/time, then communication of the reserved location to the requesting device.

Although not illustrated in FIG. 3a, it is appreciated that once the content has been stored at the storage entity (step 310), information relating to the storage location (such as a URL or other address or location information) is stored at a database associated to the recording manager 203. Alternatively, as noted above this location information may be determined and stored in the database prior to the actual storage of the content (according to a scheduled date/time). The database comprises information linking metadata regarding a subscriber and/or subscriber device to particular content and to a location at which the content is stored (or will be stored) in a storage entity (such as the cloud storage 208 or premises storage 214).

With reference now to FIG. 3b, one embodiment of a method 320 for enabling access to stored data and/or content is illustrated. Per step 322, a request to access stored content is received at e.g., the recording manager 203. The request may be received from any device configured to stream IP-packetized content, including e.g., the receiver/decoder device 210. In another variant, the request is transmitted from a mobile device 216b to the recording manager 203. In yet another alternative, the request may be generated via an interaction of a user of the mobile device 216a with a user interface run at the receiver/decoder device 210, and then transmitted from the receiver/decoder device 210 to the recording manager 203. Various other combinations, mechanisms, or devices may be utilized to generate the request as well, such as use of the aforementioned interposed or proxy device.

The request for access to stored content includes metadata identifying the requesting device and/or the requesting subscriber, as well as metadata identifying the requested content. Per step 324, the recording manager 203 accesses this metadata to determine at least one of: (i) an authentication/entitlement of the requesting device and/or user; and (ii) a location in storage of the requested content.

The determination of entitlements/authentication occurs as discussed above. Specifically, in one implementation, metadata identifying the subscriber and/or device is used to: (i) authenticate the user as a subscriber to the MSO, (ii) determine whether the requesting device is within or associated to a home network or other premises serviced by the MSO, and/or (iii) determine whether the subscriber's service level (subscription level) permits or entitles viewing of the requested content). Each of the foregoing authentication/entitlements checks may be applied as discussed elsewhere herein. As is also noted, the foregoing authentication/entitlement determination(s) may, in one embodiment, be performed at the time a request to record content was provided (see e.g., FIG. 3a) rather than being performed at this step. Alternatively, authentication/entitlements may be determined at both the time of request to record content, and the time of request to access the recorded content.

The metadata is further used, at step 326, to determine a location in storage (e.g., cloud storage 208 or premises storage 214) of the requested content. In one embodiment, as noted above, the recording manager 203 maintains a metadata/location database which is updated at each request to record content with information uniquely identifying the requesting device and/or subscriber, as well as the content and a location at which the content will be stored (i.e., the reserved location). The reserved location is updated, if necessary, at the actual time of recording. In another alternative, the database is populated only when content is actually recorded. That is, at the scheduled date/time of recording, the recording manager 203 causes the content to be recorded at the recording device and obtains a location of the recording in order to populate the database.

In this manner, the recording manager 203 queries the database for the requested content and in return provides the URL (or other location identifier) of the stored content. In one variant, the query matches at least one of the device or subscriber identifier to a stored item of content (listed by program identifier or other information), and then returns the appropriate URL.

In another variant, the previous request by that same device and/or user is not necessary for providing the requested content. In other words, a request to access recorded packetized content may be received from a device which has not previously requested that the content be recorded. In this manner, all content is made accessible to all subscribers (pending authentication/entitlements decisions, if any).

In a further embodiment, the system may predict or estimate a popularity of specific content and pre-record such content at the storage device. In this manner, the system anticipates subscriber requests or needs, and pre-positions this content in storage, such as for a designated period of time. Predictions may be based on for example a historically determined viewership for the particular content (or related content), and/or on the particular viewing patterns of individual subscribers, as well as other factors (such as e.g., the existence of competing content or events, time of day, etc.). In another variant, the recording manager 203 may decide "on the fly" to store particularly popular content and make it available for mass distribution. For instance, the recording manager 203 may take into account the number and frequency of requests for individual content items. If a particular item of content is requested for streaming and/or delivery by more than a threshold number of subscribers, and/or in a threshold time period, the content may be automatically recorded or stored.

Once the requesting device is provided the URL or other locator, the device is able to access the appropriate storage location using by, for example, entering the URL in a browser at step 330. At step 332, the content is provided to the requesting IP-capable device.

It will be appreciated that the delivery of the content in an alternative embodiment may occur automatically and/or immediately, e.g., immediately after or even contemporaneous with storage without necessitating a subsequent request for access thereto.

Figure 3C:
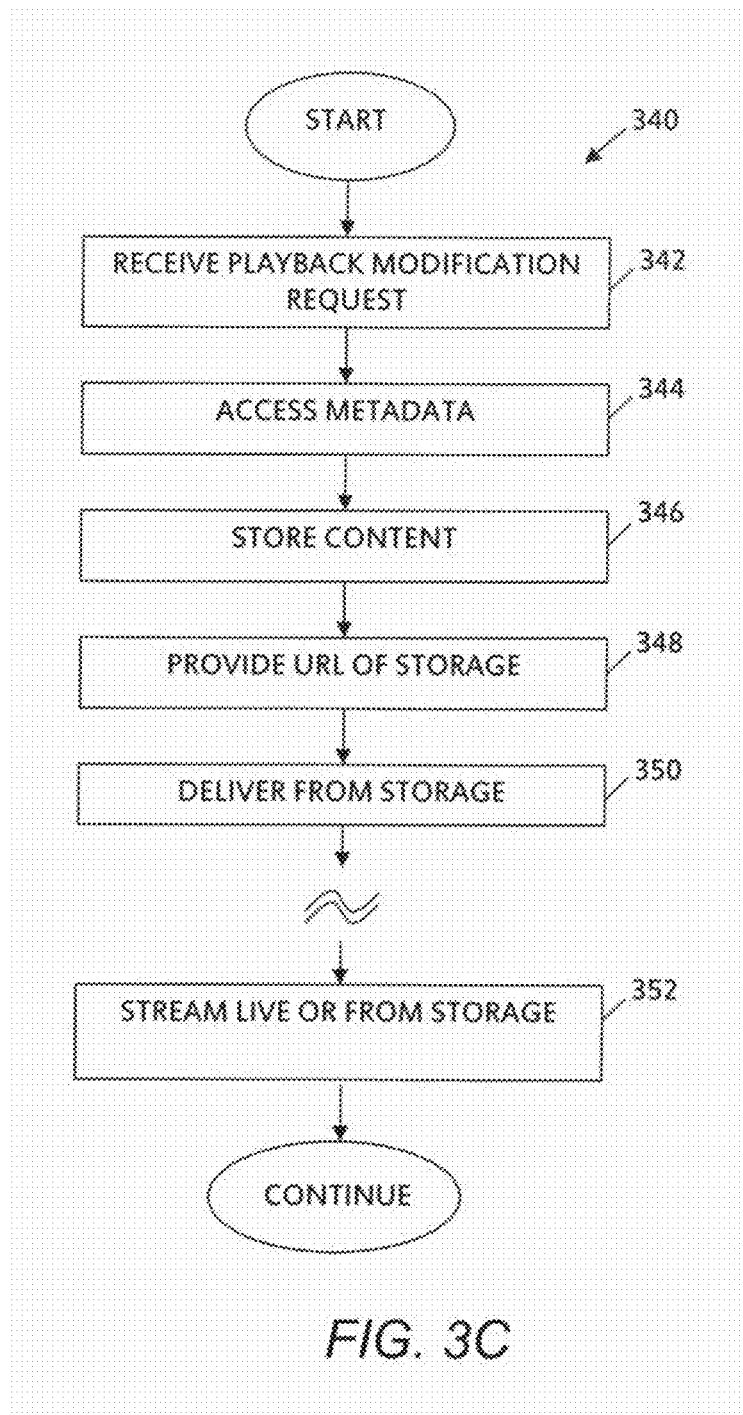
FIG. 3c is a logical flow diagram illustrating another embodiment of a method for enabling data and/or content recording management in accordance with the present disclosure.

FIG. 3c illustrates another embodiment of a method 340 for enabling data and/or content recording; specifically, FIG. 3c enables so-called "trick mode" functionality. As shown, per step 342, a playback modification request is received during the streaming of packetized content. The playback modification request may comprise e.g., a pause, fast-forward, rewind, etc. command. Logic on the receiver/decoder device 210 or mobile device 216a, 216b which receives the playback modification request is triggered to forward the request to the recording manager 203.

Per step 344, the recording manager 203 accesses metadata contained within the request. The metadata is used to identify the streaming content, and cause a storage device (either cloud storage 208 or premises storage 214) to store the content at step 346. The metadata may also be used for authentication/entitlements as discussed elsewhere herein. At step 348, a URL or other location identifier of the stored content is then provided to the receiver/decoder device 210 or mobile device 216a, 216b which originally requested the playback modification (i.e., trick mode). In this manner, the device (e.g., receiver/decoder device 210 or mobile device 216a, 216b) may stream the content from storage (step 350), which thereby enables the viewer to utilize various ones of trick mode operations with respect to the playback.

As indicated in FIG. 3c, after a period of time, playback of the content may match up temporally to the live broadcast thereof. Hence, per step 352, when this occurs, the content may be streamed live or continue to be streamed from storage.

Recording Manager—

Referring now to FIG. 4, one embodiment of the recording manager apparatus 203 adapted to manage recording, access, and delivery of packetized content is illustrated. As shown, the recording manager 203 generally comprises a network interface 402, digital processor(s) 404, a mass storage device 408, and a metadata/location database 408, although it will be appreciated that the recording manager functionality may conceivably be rendered entirely in software, such as via an application running on an extant hardware environment, or yet other form factor.

The processor 404 is configured to run a recording application 410 thereon for enabling the disclosed functionality. The recording application 410 is comprised of various constituent applications or routines, including at least a scheduler application 412, a locator application 416, and a metadata access application 414. The metadata access application 414 enables the recording manager 203 to access metadata within the requests to record, requests to access, and playback modification requests received at the recording manager 203 from the receiver/decoder device 210 and/or mobile device 216a, 216b. The metadata includes information identifying the subscriber and/or device as well as information identifying the requested content.

Metadata identifying the subscriber and/or device is used to: (i) authenticate the user as a subscriber to the MSO, (ii) determine whether the requesting device is within or associated to a home network or other premises serviced by the MSO, and/or (iii) determine whether the subscriber's service level (subscription level) permits or entitles viewing of the requested content). In one embodiment, the foregoing occur when the recording application 410 transmits the metadata to a managed network entity. Alternatively, the recording application 410 may compare the metadata to stored information and/or query a managed network database of information to determine the foregoing entitlements/authentications.

Metadata identifying the content is used by the scheduler application 412 to cause the content to be stored at a storage entity at the given date/time. In other words, the scheduler application 412 of the exemplary embodiment includes the necessary timers and commands to "awaken" at the particular date/time and cause the storage devices (which it is in communication with) to record the content.

The locator application 416 enables the determination of a location of requested content at a storage entity. For example, when a request for stored content is received, the location application 416 compares metadata in the request to metadata stored in the metadata/location database 408 to identify a URL indicating the location of the specific content. The location application 416 is also configured to update the location database 408 with e.g., reserved URL prior to actual recording of content and/or with actual URL at the time of recording. Moreover, the locator application 416 may be utilized to determine, prior to instantiating a recording by the scheduler application 412, whether the requested content has already been recorded or is already scheduled to be recorded.

As noted above, the recording manager 203 of FIG. 4 may take any number of physical forms, comprising for example software running on one of a plurality of discrete modules or cards within a larger network headend or edge device of the type well known in the art. The server may also comprise firmware, either alone or in combination with other hardware/software components such as those previously described (e.g., disposed in the aforementioned edge device). Alternatively, the recording manager 203 may be a stand-alone device disposed at the headend or other location (such as a VOD server 105 or application server 104), and may even include its own RF front end (e.g., modulators, encryptors, etc.) or optical interface so as to interface directly with various portions of the HFC network 101 if desired. Numerous other configurations may be used with any configuration or combination of hardware, firmware, or software, and may be disposed within one or any number of different physical or logical entities.

Receiver/Decoder Device—

Figure 5:
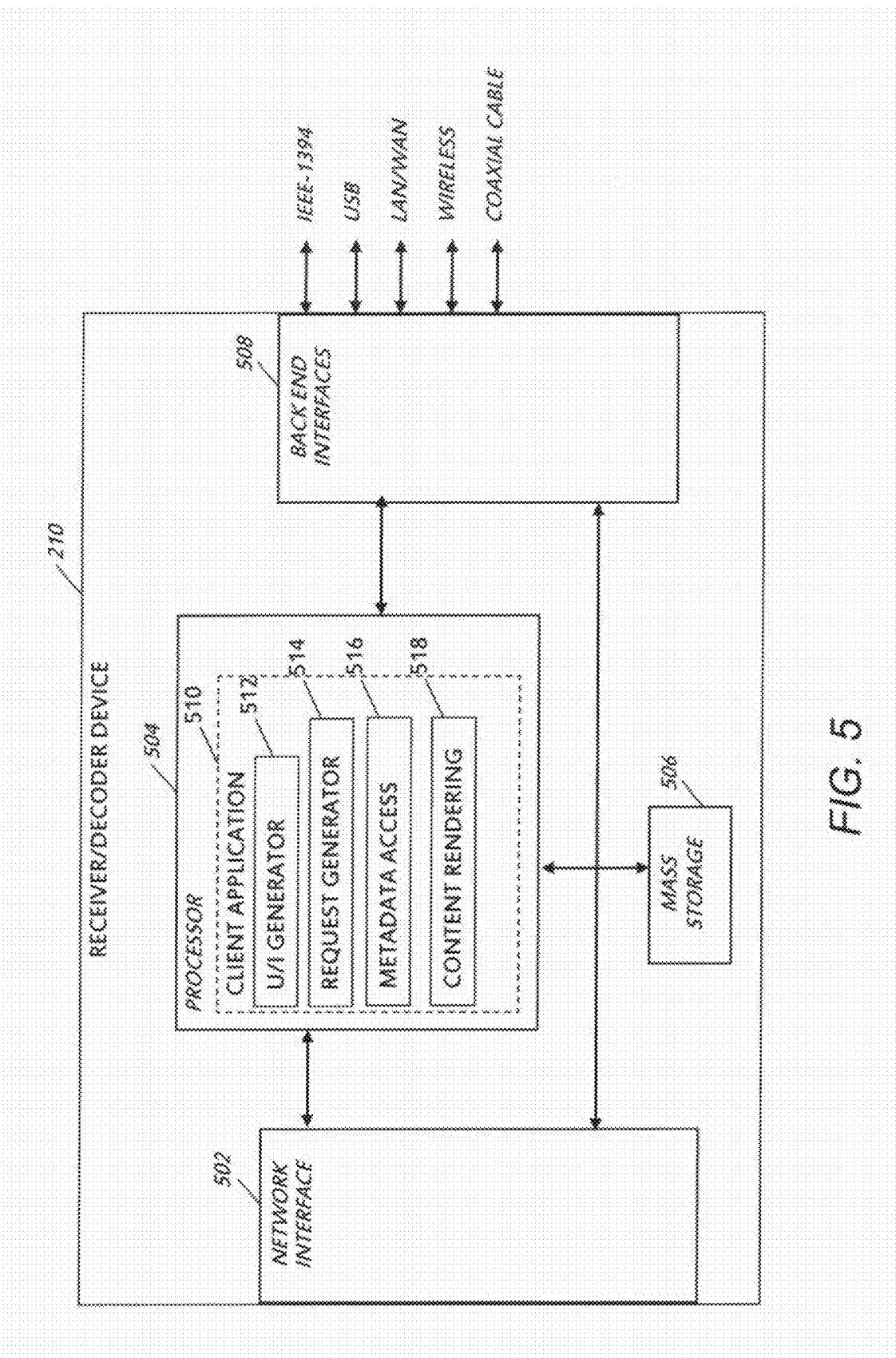
FIG. 5 is a functional block diagram of one exemplary embodiment of a receiver/decoder device for use in accordance with the present disclosure.

FIG. 5 illustrates an exemplary embodiment of a streaming device 210 with content recording and access capability as discussed herein.

As shown in FIG. 5, the receiver/decoder device 210 generally comprises front end network interfaces 502 (including demodulator/decryptors) configured to receive packetized content from e.g., an internet 111 and/or the HFC network 101, digital processor(s) 504, mass storage device 506, and a plurality of "back end" interfaces 508 (e.g., video/audio interfaces, IEEE-1394 "FireWire", USB, serial/parallel ports, ThunderBolt, Ethernet, MoCA, etc.) for interface with other end-user apparatus such as televisions, personal electronics, computers, Wi-Fi or other network hubs/routers, etc. Although various protocols and interfaces are illustrated in FIG. 5, it is appreciated that the receiver/decoder device 210 of the present disclosure may be configured to communicate using any current and future wireline and wireless interfaces and protocols. Other components which may be utilized within the device (deleted from FIG. 5 for simplicity) various processing layers (e.g., DOCSIS MAC or DAVIC OOB channel, MPEG, etc.) as well as media processors and other specialized SoC or ASIC devices.

The exemplary receiver/decoder device 210 of FIG. 5 is also provided with various client applications 510 including e.g., a U/I generator 512, a request generator 514, metadata access 516, and content rendering applications 518. The application for rendering content 518 is configured in one variant to identify and receive content for display at a display device 212. In one embodiment, a separate (dedicated) client application adapted for content selection, browsing, and download may be used (e.g., request generator application 514). This may include, e.g., a separate GUI or other type of UI, or a separate application e.g., U/I generator application 512 may be utilized for generating the user interface. Alternatively, the selection, download, and upload functionality described herein may be integrated into one or more existing or downloadable applications (such as a VOD application, "Watch TV" application, navigator, TV-commerce application, or EPG). The application (and session or other) layer protocols necessary to control the content selection, download, and upload functionality may even be disposed on another device (e.g., PDA or cellular smartphone) as previously described in order to instigate the browsing, selection, purchase, and download/streaming of content.

In another embodiment, the client applications 510 function in response to signals or communications provided by a device in communication with the receiver/decoder device 210. For example, the receiver/decoder device 210 may comprise a wireless interface (e.g., 802.11 a/b/g/n, Bluetooth, cellular, 802.15 PAN, 802.16 WiMAX, 802.20, etc.) such that it can service content selection, payment, and download/streaming requests from e.g., mobile devices 216a in communication therewith. In one such variant, the mobile device 216a comprises a tablet, laptop computer, smartphone, PDA, gaming console, or similar handheld device that has an application (such as e.g., a distributed portion of client/server application) running thereon. The mobile device application may be stand-alone, distributed or shared across the mobile device 216a and receiver/decoder device 210, or integrated with another application at the mobile device 216a. Hence, users operating the client application on the tablet/smartphone/PDA (mobile device 216a) will utilize their wireless interface to the receiver/decoder device 210 in order to remotely instigate a content streaming from the network, the latter in effect acting as a gateway to the content distribution network. The wireless forward channel(s) of the interface (e.g., receiver/decoder device 210 to mobile device 216a) can be used to transmit the content after processing (e.g., decoding) by the receiver/decoder device 210, or stream the "raw" unprocessed content (or even the received and demultiplexed MPEG encoded packets) to the mobile device 216a and/or storage 214.

As discussed above, in one instance the recording manager 203 may be tasked to cause the premises storage apparatus 214 to record content at a given date/time. This may be accomplished by the recording manager 203 at the given date/time causing the receiver/decoder device 210 to "wake up" (via a command sent thereto), stream the particular content, and have the content sent for recording at the storage apparatus 214.

Metadata access (via the metadata access application 416) is necessary to generate the user interface, generate requests, enable authentication/entitlements checks, stream content, and identify content in storage as discussed elsewhere herein.

Mobile Device—

FIG. 6 illustrates an exemplary embodiment of a mobile apparatus 216b with content recording and access capability as discussed herein. As discussed elsewhere herein, the mobile device 216b may comprise e.g., a smart phone, laptop computer, tablet, PDA, gaming console, or similar handheld device.

As shown in FIG. 6, the mobile device 216b generally comprises a network interface 602 (including for example demodulator/decryptors) for interface with an internet 111 or other network serving the user's location, digital processor(s) 604, mass storage device 606, and a plurality of interfaces 608 (e.g., video/audio interfaces, wired such as IEEE-1394 "FireWire", USB, wireless, etc.) for interface with other end-user apparatus such as televisions, personal electronics, computers, Wi-Fi APs, etc. Although various interfaces and protocols are illustrated in FIG. 6, it is appreciated that the mobile device 216b of the present disclosure may be configured to communicate over any current and future wired or wireless interfaces and protocols. Other components which may be utilized within the device have deleted from FIG. 6 for simplicity.

The mobile device processor 604 is configured to run various client applications 610 thereon. In one embodiment, a content rendering application 618 is provided to access and stream content to a display apparatus associated with the mobile device 216b. In one embodiment, a separate (dedicated) client application adapted for content selection, browsing, download, and upload may be used (e.g., request generator application 614). Another separate application may but utilized to generate a GUI or other type of UI (e.g., U/I generator application 614). Alternatively, the selection, download, and upload functionality described herein may be integrated into one or more existing or downloadable applications (such as a VOD application, "Watch TV" application, navigator, TV-commerce application, or EPG).

In the event the mobile device 216b utilizes the recording manager 203 to cause recording of content at the cloud storage 208, the request generator application 614 and metadata access application 616 cooperate to request access to the recorded content from the recording manager 203. The recording itself being facilitated by the recording manager 203 and other managed network entities configured to stream packetized content or otherwise receive the content from a content source.

Individualized Content Channel Variants—

In one aspect, the foregoing techniques of receipt and storage of packetized content may be combined with personalized virtual or other content channel approaches to, inter alia, leverage data relating to user behavior on a per-user basis. See for example co-owned and co-pending U.S. patent application Ser. No. 12/414,554 filed Mar. 30, 2009 entitled "PERSONAL MEDIA CHANNEL APPARATUS AND METHODS", and published on Sep. 30, 2010 as U.S. Patent Application Publication No. 2010/0251304, which is incorporated herein by reference in its entirety, which discloses among other things, methods and apparatus for "fused" targeted content delivery in a content distribution network. Specifically, a substantially user-friendly mechanism for viewing content compiled from various sources is provided, and content selected to align with a user's preferences is displayed as a substantially continuous stream as part of a "virtual" user-based channel. In one embodiment, a user profile is constructed and targeted content gathered without requiring any user intervention whatsoever; e.g., based on a user's past or contemporaneous interactions with respect to particular types of content. This information can be generated by, for example, a recommendation "engine" such as that described in co-owned U.S. patent application Ser. No. 12/414,576 filed Mar. 30, 2009 entitled "RECOMMENDATION ENGINE APPARATUS AND METHODS", issued as U.S. Pat. No. 9,215,423 on Dec. 15, 2015, which is incorporated herein by reference in its entirety. The "virtual channel" acts as a centralized interface for the user and their content selections and preferences, as if the content relevant to a given user were in fact streamed over one program channel. The compiled content may also be presented to the user in the form of a "playlist" from which a user may select desired content for viewing and/or recording. The user is able to navigate between on-demand content, the virtual channel, an EPG, a search tool, and a DVR navigation tool from a single user interface (e.g., on-screen display).

In another aspect, client applications (e.g., those disposed on a subscriber's receiver/decoder device 210 or mobile device 216a, 216b and/or network servers such as the recording manager 203) are utilized to compile the playlist based on user-imputed as well as pre-programmed user profiles. Various feedback mechanisms may also be utilized to enable the client application to "learn" from the user's activities in order to update the user profile and generate more finely-tuned and cogent recommendations. For example, as a subscriber watches more of a certain actor films and other content including that actor will be recommended, when the subscriber starts to decline content in the genre of comedy which are recommended because they star the given actor, the system will further narrow its recommendations to non-comedy content staring the actor, and so forth. Client applications may also be utilized to manage the seamless presentation of content on the virtual channel, and locate/flag various scenes inside selected content for user viewing or editing (or other uses, such as forwarding/ identifying to other users who may be interested in the content).

Hence, in one variant, logic is included within the receiver/decoder device 210, mobile device 216*a*, 216*b*, and/or recording manager 203 such that the items which are selected to populate the user's virtual channel are selectively streamed and/or selected for recording, so as to populate the storage entity of the network 208 associated with that user (or premises storage 214) with content that has been particularly selected for that user/premises. When a user selects something outside of the recommended content, the logic is configured in one embodiment to cause streaming and/or storage of that content onto the storage entity, so as to update the storage on a rolling basis.

Single Copy Assurances—

In another embodiment, recorded content may be shared across multiple devices according to the methods disclosed in co-owned U.S. patent application Ser. No. 12/901,417 filed on Oct. 8, 2010 and entitled "APPARATUS AND METHODS FOR ENFORCING CONTENT PROTECTION RULES DURING DATA TRANSFER BETWEEN DEVICES", and issued as U.S. Pat. No. 9,015,270 on Apr. 21, 2015, which is incorporated herein by reference in its entirety. As discussed therein, data and content are transferred between devices while maintaining protection rules of the content. In one exemplary embodiment, a server located at the managed network is utilized to determine not only copy protection rights (such as those utilized by the well known Digital Transmission Content Protection-Internet Protocol (DTCP-IP)), but also the rights of specific requesting subscribers to access, use, copy, and/or distribute content. These rules are provided to, and implemented by, a subscriber device requesting specific content. Specifically, the subscriber device implements the protection rules when determining how the content may be used, and whether the content may be provided to subsequent devices.

In one further embodiment, the content may be provided to multiple devices consistent with the protection rules thereof by causing the storage device (e.g., premises storage 214 or cloud storage 208) to generate a mobile or transferrable version of content, and providing this version to the requesting device. To avoid having multiple available versions of the same content existing, the storage device (and/or recording manager 203) employs in one variant a mechanism for marking the original content (stored at the premises storage 214 or cloud storage device 208) so that it is unavailable for use or further transfer while the mobile version exists at the target device (i.e., so-called "check out"). In this manner, there is at any one time only one available or useable version of the content for the given subscriber. The subscriber may reinstate the original version of the content at the subscriber device (i.e., so-called "check in") in order for it to be used thereon, or to be transferred to yet another device. Reinstatement is accomplished in one implementation by deleting the version existing at the first target device, and transmitting a signal or message back to the recording manager 203 or storage device indicating that the copy has been deleted. This transmission then causes the subscriber device to "unblock" the original version of the content as stored thereon.

In another implementation, the content, rather than being copied, is merely moved from the storage device to another subscriber device. According to this implementation, the content must be moved back to the storage device in order for it to become useable and/or transferrable again.

It will be recognized that while certain aspects herein are described in terms of a specific sequence of steps of a method, these descriptions are only illustrative of a broader method and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the aspects disclosed and claimed herein.

While the above detailed description has shown, described, and pointed out novel features as applied to various embodiments, it will be understood that various omissions, substitutions, and changes in the form and details of the device or process illustrated may be made by those skilled in the art. This description is in no way meant to be limiting, but rather should be taken as illustrative of the general principles. The scope should be determined with reference to the claims.

What is claimed is:

1. A computerized method of providing digitally rendered content to a computerized client device of a managed network, the computerized method comprising:

receiving data relating to a request to record a streamable digital content element, the request originating from a computerized client device associated with a user identifier;

processing a plurality of user data, the plurality of user data comprising at least the user identifier;

based at least in part on the processing of the plurality of user data, forming a virtual control boundary corresponding to the user identifier, the virtual control boundary extending one or more of possession or control from the computerized client device to at least a digital storage location within a multi-user partitioned cloud-based storage apparatus of the managed network;

based at least in part on the request and the virtual control boundary, causing storage of the streamable digital content element at the digital data storage location within the multi-user partitioned cloud-based storage apparatus via a recording apparatus of the managed network; and subsequent to the storage of the streamable digital content element, enabling availability of the stored digital content element for streaming delivery from the digital storage location within the multi-user partitioned cloud-based storage apparatus over the managed network;

wherein the data relating to the request at least in part comprises metadata; and wherein the computerized method further comprises:

utilizing at least the metadata to determine that the computerized client device is a legacy, non-IP enabled device; and based on determining that the computerized client device is a legacy, non-IP enabled device, delivering via a streaming delivery session the stored digital content element to a non-legacy, IP enabled computerized client device associated with the user identification.

2. The computerized method of claim 1, further comprising:
utilizing the metadata to validate whether the user identifier is associated with a registered subscriber of the managed network; and
based at least in part on a determination that the user identifier is validated as associated with the registered subscriber of the managed network, establishing a data communications session between the computerized client device and a computerized process of the managed network;
wherein the metadata further comprises data identifying one or more of the user or the computerized client device.

3. The computerized method of claim 2, wherein the user identifier comprises a globally unique identifier (GUID) and/or log-in information.

4. The computerized method of claim 1, further comprising utilizing the metadata to determine whether the computerized client device is within or associated to a premises serviced by the managed network, the determination comprising associating the computerized client device with an authorized network access point.

5. The computerized method of claim 1, further comprising utilizing the metadata to authorize access to the streamable digital content element based on a subscription level associated with the user identifier.

6. The computerized method of claim 1, wherein the database comprises information linking metadata regarding at least one of (i) the user identifier, and (ii) the computerized client device to the streamable digital content element and to the digital data storage location, the digital data storage location within the multi-user partitioned cloud-based storage accessible to a plurality of computerized client devices associated with the user identifier.

7. The computerized method of claim 1, wherein:
the plurality of user data further comprises data relating to one or more common characteristics associated with the user identifier and one or more other user identifiers, the one or more other user identifiers each associated with one or more other computerized client devices; and
the forming the virtual control boundary comprises forming a group virtual control boundary corresponding to (i) the user identifier and (ii) the one or more other user identifiers.

8. The computerized method of claim 7, wherein the forming the group virtual control boundary comprises forming the group virtual control boundary using at least a plurality of individual virtual control boundaries.

9. The computerized method of claim 7, wherein the enabling availability of the stored digital content element for streaming delivery over the managed network from the location within the multi-user partitioned cloud-based storage comprises enabling availability of the stored digital content element for streaming delivery from the location within the multi-user partitioned cloud-based storage over the managed network to only the non-legacy, IP enabled computerized client device and the one or more other computerized client devices respectively associated with the one or more other in the group virtual control boundary.

10. Computerized network apparatus having a non-transitory computer readable storage medium comprising at least one computer program, the at least one computer program comprising a plurality of instructions which are configured to, when executed by a processing apparatus, cause the computerized network apparatus to:
receive, from a first computerized client device, data indicative of a request for recording a live digital content element, the data indicative of the request at least in part comprising metadata;
cause transmission of data relating to at least one message to a computerized network entity in data communication with a managed network, the computerized network entity configured to cause recording of the live digital content element at a predetermined time, the at least one message comprising at least information identifying at least the live digital content element;
receive data indicative of at least a digital data storage location where the recorded live digital content element is located, the digital data storage location associated with at least the first computerized client device;
identify, based at least in part on the metadata, that the first computerized client device is a non-IP enabled client device;
form a trusted domain between at least the first computerized client device and one or more IP enabled computerized client devices, the trusted domain configured to enable content access and based at least in part on common user identifier shared by the first computerized client device and the one or more IP enabled computerized client devices; and
based at least in part on the formed trusted domain and the identifying, provide the digital data storage location of the recorded live digital content element to at least a first one of the one or more IP enabled computerized client devices so as to enable streaming of the recorded live digital content element to the at least first one of the one or more IP enabled computerized client devices via the managed network.

11. The computerized network apparatus of claim 10, wherein the digital data storage location comprises a cloud storage apparatus disposed an edge node of the managed network, the disposition of the cloud storage apparatus at the edge node configured to distribute at least a portion of a load associated with delivery of the recorded live digital content element away from a core portion of the managed network.

12. The computerized network apparatus of claim 10, wherein the plurality of instructions are further configured to, when executed by the processing apparatus, cause the computerized network apparatus to generate data indicative of a prediction of a popularity of the live digital content element, the live digital content element automatically stored based at least in part on the data indicative of the prediction.

13. The computerized network apparatus of claim 12, wherein data indicative of the prediction of the popularity of the live digital content element comprises an evaluation of historical viewership data and a frequency of requests for the live digital content element.

14. The computerized network apparatus of claim 10, wherein the plurality of instructions are further configured to, when executed by the processing apparatus, cause the computerized network apparatus to:
receive a plurality of data relating to respective ones of a plurality of other requests to record the live digital content element, the plurality of other requests originated from respective second ones of the one or more other computerized client devices;
automatically cause storage of the live digital content element at the digital data storage location based at least in part on a number of the request and the plurality of other requests meeting or exceeding a predetermined threshold value; and enable the respective second ones of the one or more other computerized client devices to access the recorded digital content element via provision of the information regarding the digital data storage location to the respective second ones of the one or more other computerized client devices.

15. The computerized network apparatus of claim 10, wherein the plurality of instructions are further configured to, when executed by the processing apparatus, cause the computerized network apparatus to discard duplicate ones of the request and one or more other requests for recording the live digital content element respectively originated from the first computerized client device and the second one or more other computerized client devices, based at least in part on formation of the trusted domain, thereby economizing storage requirements at the network digital data storage location.

16. Computerized network apparatus for delivery of digitally rendered content to at least one IP (Internet Protocol) enabled computerized client device over a content delivery network, the computerized network apparatus comprising:

a processor apparatus;

a storage element in data communication with the processor apparatus, the storage element comprising at least one computer program, the at least one program comprising a plurality of instructions which are configured to, when executed by the processor apparatus, cause the computerized network apparatus to:

receive data relating to one or more requests for recording a live, streaming digital content element, the data relating to one or more requests (i) originating from a first client device and (ii) at least in part comprising metadata;

utilize the metadata to identify that the first client device is a legacy, non-IP enabled client device;

identify an association between the first client device and the at least one IP enabled computerized client device based at least in part on a user identifier, the user identifier associated with each of the first client device and the at least one IP enabled computerized client device;

based at least in part on the data relating to the one or more requests and the identified association, cause storage of the live, streaming digital content element at a network digital data storage location, the network digital storage location being (i) accessible to the at least one IP enabled client device and (ii) inaccessible to the first client device; and provide, based at least in part on the metadata identifying the first client device as a legacy, non-IP enabled client device, information regarding the digital data storage location to the at least one IP enabled computerized client device so as to enable access to the recorded live, streaming digital content element to the at least one IP enabled computerized client device via the content delivery network.

17. The computerized network apparatus of claim 16, wherein the plurality of instructions are further configured to, when executed by the processor apparatus, cause the computerized network apparatus to:

utilize at least the data relating to the one or more requests to determine whether one or more of the IP enabled client device or the first client device are within or associated to a premises serviced by the content delivery network, the determination comprising an association of the one or more of the IP enabled client device or the first client device with an authorized network access point; and enable one or more other computerized client devices within or associated to the premises to access to access the recorded digital content element via provision of the information regarding the digital data storage location to the one or more other computerized client devices.

* * * * *